United States Patent
Aronov et al.

(10) Patent No.: US 11,228,195 B2
(45) Date of Patent: Jan. 18, 2022

(54) LITHIUM ION DEVICES, OPERATED WITH SET OPERATIVE CAPACITY

(71) Applicant: StoreDot Ltd., Herzeliya (IL)

(72) Inventors: Daniel Aronov, Netanya (IL); Avraham Edelshtein, Herzelia (IL); Ohad Goldbart, Yehud (IL); Simon Litsyn, Tel Aviv (IL); Nicky Zintchenko Nachshony, Tel Aviv (IL)

(73) Assignee: STOREDOT LTD., Herzeliya (IL)

( * ) Notice: Subject to any disclaimer, the term of this patent is extended or adjusted under 35 U.S.C. 154(b) by 243 days.

(21) Appl. No.: 16/389,951

(22) Filed: Apr. 21, 2019

(65) Prior Publication Data
US 2020/0335980 A1    Oct. 22, 2020

(51) Int. Cl.
*H02J 7/00* (2006.01)
*H01M 10/48* (2006.01)
*H01M 10/44* (2006.01)
*H01M 10/0525* (2010.01)

(52) U.S. Cl.
CPC ......... *H02J 7/007* (2013.01); *H01M 10/0525* (2013.01); *H01M 10/44* (2013.01); *H01M 10/48* (2013.01)

(58) Field of Classification Search
CPC .... H02J 7/007; H02J 7/00712; H02J 7/00711; H01M 10/48; H01M 10/44; H01M 10/0525; Y02E 60/10
See application file for complete search history.

(56) References Cited

U.S. PATENT DOCUMENTS

| | | | |
|---|---|---|---|
| 5,393,617 | A | 2/1995 | Klein |
| 9,406,927 | B1 | 8/2016 | Burshtain et al. |
| 10,122,042 | B2 | 11/2018 | Krasovitsky et al. |
| 10,199,677 | B2 | 2/2019 | Drach et al. |
| 2003/0193318 | A1 | 10/2003 | Ozawa et al. |

(Continued)

FOREIGN PATENT DOCUMENTS

WO    WO 2018/109774    6/2018

OTHER PUBLICATIONS

Ning et al. "Cycle Life Modeling of Lithium-Ion Batteries", Journal of The Electrochemical Society, Jan. 1, 2004, vol. 151, No. 10, pp. A1584-A1591.

(Continued)

*Primary Examiner* — Stacy Whitmore
(74) *Attorney, Agent, or Firm* — Reches Patents

(57) ABSTRACT

Systems and methods are provided for operating lithium ion devices by setting an operative capacity below a rated capacity value of the lithium ion device, and operating the lithium ion device at the set operative capacity by decreasing a lower voltage cutoff value during discharging and/or by increasing an upper voltage cutoff level during charging—to support operation at the set operative capacity. The systems and methods may utilize residual lithium in device components such as anodes, cathodes, electrolyte etc. or combinations thereof, and/or external lithiation to increase the cycling lifetime of the lithium ion devices, to adapt to user preferences and expected use profiles, and to simplify device status indications to the user. Advantageously, relatively simple circuitry is required to implement the provided methods and systems, and achieve customizable operation of the lithium ion devices.

16 Claims, 13 Drawing Sheets

(56) References Cited

U.S. PATENT DOCUMENTS

| | | |
|---|---|---|
| 2006/0033469 A1 | 2/2006 | Beaty et al. |
| 2007/0126404 A1 | 6/2007 | Iida et al. |
| 2009/0035664 A1 | 2/2009 | Chiang et al. |
| 2009/0117466 A1 | 5/2009 | Zhamu et al. |
| 2009/0128097 A1 | 5/2009 | Esnard |
| 2009/0153100 A1 | 6/2009 | Okumura et al. |
| 2009/0160403 A1 | 6/2009 | Takeno et al. |
| 2009/0291368 A1 | 11/2009 | Newman et al. |
| 2010/0052616 A1 | 3/2010 | Takada et al. |
| 2010/0264929 A1 | 10/2010 | Ugaji et al. |
| 2013/0202945 A1 | 8/2013 | Zhamu et al. |
| 2013/0307485 A1 | 11/2013 | He et al. |
| 2013/0319870 A1 | 12/2013 | Checn et al. |
| 2014/0272534 A1 | 9/2014 | Ueki et al. |
| 2016/0344068 A1 | 11/2016 | Kim et al. |
| 2017/0294687 A1 | 10/2017 | Burshtain et al. |
| 2018/0115024 A1 | 4/2018 | Sugeno et al. |
| 2018/0301749 A1* | 10/2018 | Krasovitsky .......... H02J 7/0069 |
| 2018/0358661 A1* | 12/2018 | Yebka ................... H01M 10/48 |
| 2019/0074704 A1 | 3/2019 | Krasovitsky et al. |
| 2019/0148774 A1 | 5/2019 | Kuks et al. |
| 2020/0119411 A1* | 4/2020 | Krasovitsky ............ H02J 7/005 |

OTHER PUBLICATIONS

US Office Action for U.S. Appl. No. 15/867,764, dated May 10, 2018.

Office action for U.S. Appl. No. 16/180,066, dated Dec. 9, 2019.

Office Action for corresponding U.S. Appl. No. 16/012,781, dated Sep. 19, 2019.

Office Action for U.S. Appl. No. 16/258,733, dated Apr. 8, 2019.

Office Action for U.S. Appl. No. 16/254,632, dated Apr. 12, 2019.

* cited by examiner

LITHIUM ION DEVICES, OPERATED WITH SET OPERATIVE CAPACITY

BACKGROUND OF THE INVENTION

1. Technical Field

The present invention relates to the field of energy storage devices, and more particularly, to operating lithium ion devices to extend their cycling lifetime and simplifying user interface therewith.

2. Discussion of Related Art

Lithium ion batteries are used for a growing range of applications, as their safety and performance are improved. However, lithium ion batteries commonly suffer from a relatively short cycling lifetime, expressed by fading of their capacity.

SUMMARY OF THE INVENTION

The following is a simplified summary providing an initial understanding of the invention. The summary does not necessarily identify key elements nor limit the scope of the invention, but merely serves as an introduction to the following description.

One aspect of the present invention provides a method of operating a lithium ion device, the method comprising: setting an operative capacity below a rated capacity value of the lithium ion device, and operating the lithium ion device at the set operative capacity by decreasing a lower voltage cutoff value during discharging and/or by increasing an upper voltage cutoff level during charging to support operation at the set operative capacity Another aspect of the present invention provides a controller for operating a lithium ion device, the controller configured to operate the lithium ion device at a predetermined set operative capacity, which is smaller than a rated capacity value of the lithium ion device, by decreasing a lower voltage cutoff value during discharging and/or by increasing an upper voltage cutoff level during charging.

These, additional, and/or other aspects and/or advantages of the present invention are set forth in the detailed description which follows; possibly inferable from the detailed description; and/or learnable by practice of the present invention.

BRIEF DESCRIPTION OF THE DRAWINGS

For a better understanding of embodiments of the invention and to show how the same may be carried into effect, reference will now be made, purely by way of example, to the accompanying drawings in which like numerals designate corresponding elements or sections throughout.

In the accompanying drawings.

DETAILED DESCRIPTION OF THE INVENTION

Figure 1:
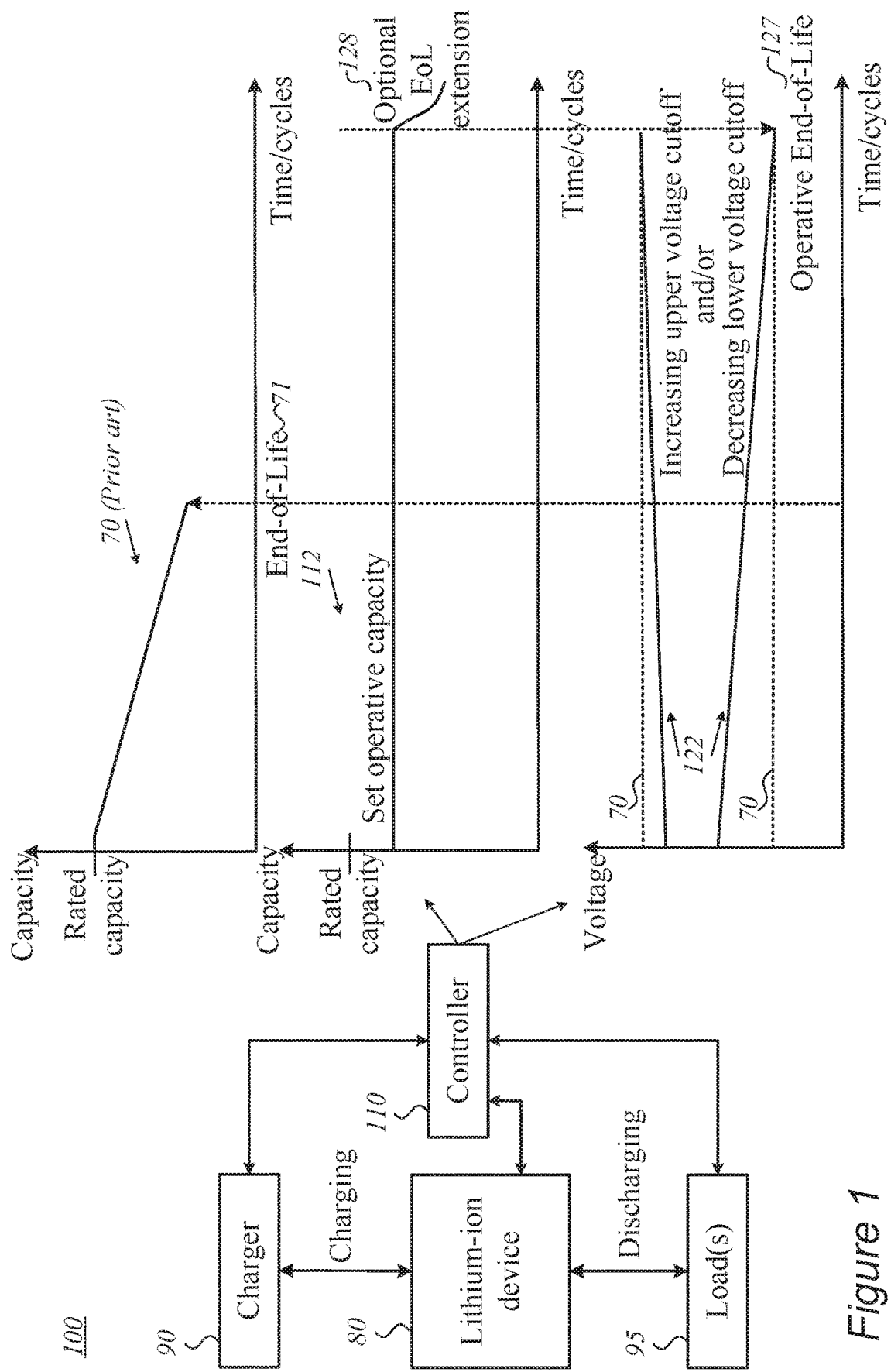
FIG. 1 is a high-level schematic block diagram of a system and a controller for operating lithium ion devices, according to some embodiments of the invention.

In the following description, various aspects of the present invention are described. For purposes of explanation, specific configurations and details are set forth in order to provide a thorough understanding of the present invention. However, it will also be apparent to one skilled in the art that the present invention may be practiced without the specific details presented herein. Furthermore, well known features may have been omitted or simplified in order not to obscure the present invention. With specific reference to the drawings, it is stressed that the particulars shown are by way of example and for purposes of illustrative discussion of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Before at least one embodiment of the invention is explained in detail, it is to be understood that the invention is not limited in its application to the details of construction and the arrangement of the components set forth in the following description or illustrated in the drawings. The invention is applicable to other embodiments that may be practiced or carried out in various ways as well as to combinations of the disclosed embodiments. Also, it is to be understood that the phraseology and terminology employed herein are for the purpose of description and should not be regarded as limiting.

Unless specifically stated otherwise, as apparent from the following discussions, it is appreciated that throughout the specification discussions utilizing terms such as "processing", "computing", "calculating", "determining", "enhancing", "deriving" or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

Embodiments of the present invention provide efficient and economical methods and mechanisms for managing operation and extending cycling lifetime of lithium ion devices, and thereby provide improvements to the technological field of energy storage devices and their use. Systems and methods are provided for operating lithium ion devices by setting an operative capacity below a rated capacity value of the lithium ion device, and operating the lithium ion device at the set operative capacity by decreasing a lower voltage cutoff value during discharging and/or by increasing an upper voltage cutoff level during charging—to support operation at the set operative capacity. The systems and methods may utilize residual lithium in device components such as anodes, cathodes, electrolyte etc., or combinations thereof, and/or external lithiation to increase the cycling lifetime of the lithium ion devices, to adapt to user preferences and expected use profiles, and to simplify device status indications to the user and corresponding used interface with the lithium-ion device. Advantageously, relatively simple circuitry is required to implement the provided methods and systems, and achieve customizable operation of the lithium ion devices.

For example, instead of prior art operation in which the device capacity (rated capacity, the amount of charge it can receive, e.g., in Ah) deteriorates during operation, disclosed embodiments provide a constant capacity value that is kept constant at a value lower than the rated capacity, and maintained by gradually broadening the voltage window for charging and/or discharging the device. Advantageously, both cycling lifetime in increased, and the energy storage device use is simplified as the operative capacity is maintained at a constant value. In various embodiments, the constant capacity may be modified according to user preferences, additional capacity may be provided in emergency cases, or the constant capacity may be modified into a variable capacity (e.g., according to user requirements), yet in any case, the operative capacity is handled and controlled as a specified parameter rather than being a result of the device's state of health as in the prior art. Moreover, the operative capacity may be controlled and manipulated irrespective of the degradation of the device (which in the prior art directly causes a degradation of the resulting capacity with respect to the rated capacity). Various embodiments enhance the predictability and the ability to control device performance, which is highly advantageous over a range of device applications.

FIG. 1 is a high-level schematic block diagram of a system 100 and a controller 110 for operating lithium ion devices 80, according to some embodiments of the invention. In various embodiments, lithium ion devices 80 may have at least one lithium ion cell comprising anodes with metalloid-based anode active material and/or lithium ion devices 80 may have at least one lithium ion cell comprising anodes with carbon-based anode active material (e.g., based on graphite, graphene or other carbon forms such as hard or soft carbon, carbon nanotubes, etc.). As used herein "lithium ion device" includes, but is not limited to, one or more lithium ion secondary battery(ies) and/or cell(s), module(s) or pack(s), having anode(s) and cathode(s) enclosed with electrolyte (and separator(s)) within various types of packaging, having corresponding rated capacity(ies). Disclosed lithium ion devices 80 may be configured to be connected to charger(s) for charging device(s) 80 and may be configured to be connected to load(s) for discharging device(s) 80.

In various embodiments, lithium ion devices 80 may have at least one lithium ion cell based on any available anode technology, such as transition metal carbides, carbonitrides and nitrides, metalloids, metals, metal oxides, metal sulfides, Li metal; Li titanate; Li-air/oxygen etc.; and/or based on any available cathode technology such as lithium metal oxides (e.g., LiMeO, with Me denoting one or several metals selected from Ni, Co, Mn and Al) and sulfur-based cathodes, at various structures such layered, spinel and/or olivine frameworks, as listed below in detail. Lithium ion devices 80 may comprise one or more cells (of any type), one or more cell modules and/or one or more batteries.

In certain embodiments, disclosed systems 100, controllers 110 and methods 200 may be applied to devices 80 which are not lithium ion devices but energy storage devices that utilize alkali or alkaline ions other than lithium, such as sodium or magnesium for example—adapting the working potentials to the respective device chemistry. For example, disclosed systems 100, controllers 110 and methods 200 may be applied to sodium-ion devices 80 using sodium-manganese cathodes (e.g., $Na_xMnO_2$ with $0.25<x<0.65$, having a corresponding potential range of 2V-3.8 V), using layered materials as $Na_xMO_2$ (with M being Mn and/or Co), using intercalating agents (e.g., $Na_3V_2(PO_4)_3$, $Na_{0.85}Li_{0.17}Ni_{0.21}Mn_{0.64}O_2$), layered sodium iron fluorophosphates, nanocrystalline-based materials such as Tavorite, etc.; e.g., with carbon-based or other anodes, comprising, e.g., hard carbon, hydrogen-containing carbon, porous carbon etc. as well as $TiO_2$, materials of the NASICON family ($Na_{1+x}Zr_2Si_xP_{3-x}O_{12}$, $0<x<3$, or compounds in which the Na, Zr and/or Si are replaced by isovalent elements); and with electrolytes comprising salts such as $NaPF_6$, $NaCl_4$ and/or other sodium-based salts. In another example, disclosed systems 100, controllers 110 and methods 200 may be applied to magnesium-ion devices 80 using cathodes comprising, e.g., Chevrel phase compounds based on variations of $MMo_6X_y$ (with M=metal, e.g., Pb, Sn, Ba, Ag, Cu, Ln, X=S, Se, Te, y between 6 and 8), using intercalating agents such as $V_2O_5$, $MnO_2$, $MoS_2$, $TiO_2$, $TiS_2$ etc., sulfur-based cathodes etc.; with anodes comprising Mg metal, Mg nanoparticles or any other form of Mg, and/or Mg-ion insertion anodes such as Bi and/or Sn that create intermetallic compounds, or possibly phosphorus and/or carbon-based anodes, or spinel materials such as $Li_4Ti_5O_{12}$.

Controller 110 may be configured to operate lithium ion device 80 with respect to charger(s) 90 and/or load(s) 95, at a set operative capacity 112, which is smaller than a rated capacity value of lithium ion device 80, by decreasing a lower voltage cutoff value during discharging and/or by increasing an upper voltage cutoff level during charging 122. For example, set operative capacity 112 (see, e.g., schematic graphs 112, 113 in FIGS. 2, 4A and 8B) may be between 80% and 95% or between 85% and 90% of the rated capacity of lithium ion device 80. Set operative capacity 112 may be a constant value, a predefined increasing or decreasing value, a value that is determined periodically, e.g., every several operation cycles and/or according to user preferences, or a value which fluctuates, e.g., by any of ±1%, ±5%, ±10%, ±20% (or intermediate values) with respect to any of the above. In certain embodiments, exceptional emergency use cases may be applied, overruling the regular operation according to set operative capacity 112.

Controller 110 may be configured to respectively allow, during operation, a lower voltage cutoff value decrease and/or allow an upper voltage cutoff level to increase (see, e.g., schematic graphs 122 in FIGS. 3A-3C)—to maintain the capacity at set operative capacity 112, and to utilize lithium in the device to support the maintained capacity and the decreasing lower voltage cutoff value and/or the increased upper voltage cutoff level—to define a target device state of health (SoH), at set operative capacity 112.

In certain embodiments, target device SoH may be internally linked with the degradation state of the device components, e.g., anodes, cathodes, electrolyte etc., or combinations thereof, while externally the set capacity is maintained constant.

In certain embodiments, lithium may be supplanted to one or more device component (e.g., anodes, cathodes, electrolyte etc., or combinations thereof) during operation of lithium ion device 80, as disclosed, e.g., in U.S. Pat. No. 10,122,042, incorporated herein by reference in its entirety. When implemented, operative capacity 112 may be set and/or modified with respect to the supplanted lithium, utilizing the provided added source for increasing the device's cycling lifetime For example, in certain embodiments, controller 110 may be configured to carry out the decreasing of the lower voltage cutoff value during discharging to utilize lithium residuals in anodes of lithium ion device 80 and/or to carry out the increasing of the upper voltage cutoff value during charging to utilize lithium residuals in cathodes of lithium ion device 80—according to corresponding characteristics of lithium ion device 80, e.g., according to characteristics of lithium ion device 80 that correspond to the respective lithium residuals. The lithium residuals in the anode(s), cathode(s) or other components of device 80 may be determined using a theoretical model or simulation, or using corresponding sensors, probes or measurement systems. In certain embodiments, sensor(s) or probe(s) may be configured to monitor residual lithium content in the anode(s) and/or in cathode(s) of lithium ion device 80 and communicate the monitored content to controller 110. In certain embodiments, residual lithium content may be derived from operational parameters of lithium ion device 80 such as the changes in voltage cutoffs, or provided energy or charge under specified conditions (e.g., cumulative charged and discharged charge).

In certain embodiments, the defined target device SoH may be set as an operative end-of-life (EoL) 127 that corresponds to the number of cycles that support provision of the operative capacity, e.g., supporting the specified operative capacity by voltage compensation without capacity degradation. Once no voltage compensation is possible for the capacity degradation, operative EoL 127 may be defined (see e.g., FIG. 7C below). Operative EoL 127 may be determined by the EoL of any of the device's components (e.g., anodes, cathodes, electrolyte or combinations thereof), and may therefore be longer than prior art device EoL 71, which is typically determined by a specified degradation of the device's capacity, possibly missing on cycles that can be made available by voltage compensation and/or applying larger depth of discharge (DoD) than disclosed embodiments (having operative capacity 112 lower than the rated capacity). In certain embodiments, disclosed systems 100 may be configured to utilize the lithium in the device components, such as anode(s), cathode(s) and/or electrolyte, to equalize device degradation with the degradation of one or more of its components, at the set constant capacity value. Examples for lithium ion devices 80 having anodes with metalloid-based anode active material are provided below. Certain embodiments comprise implementing the disclosed approach to lithium ion devices 80 having cells with carbon-based anode materials, extending their cycling lifetime.

In contrast to the prior art in which capacity decreases until reaching a threshold (e.g., 80%) that indicates the device predefined EoL 71 (see, e.g., schematic graph 70 in FIG. 2), disclosed embodiments utilize lithium in metalloid-based (or carbon-based) anodes or in other cell components to allow the cells and respective components thereof to controllably degrade during operation of lithium ion device 80, thereby extending operative EoL 127 (or other target SoH) to the EoL (or other target SoH) of the actual degrading component (e.g., anodes, cathodes, electrolyte or combinations thereof). Advantageously, rather than prior art indirectly defining the device EoL at the beginning of component degradation, disclosed embodiments allow for some component degradation as long as device performance remains as required, extending device cycling lifetime, and moreover provide the user with set operative capacity 112 (which may vary though, e.g., in emergency cases or according to anticipated daily use, as disclosed below), that simplifies device use.

Figure 7A:
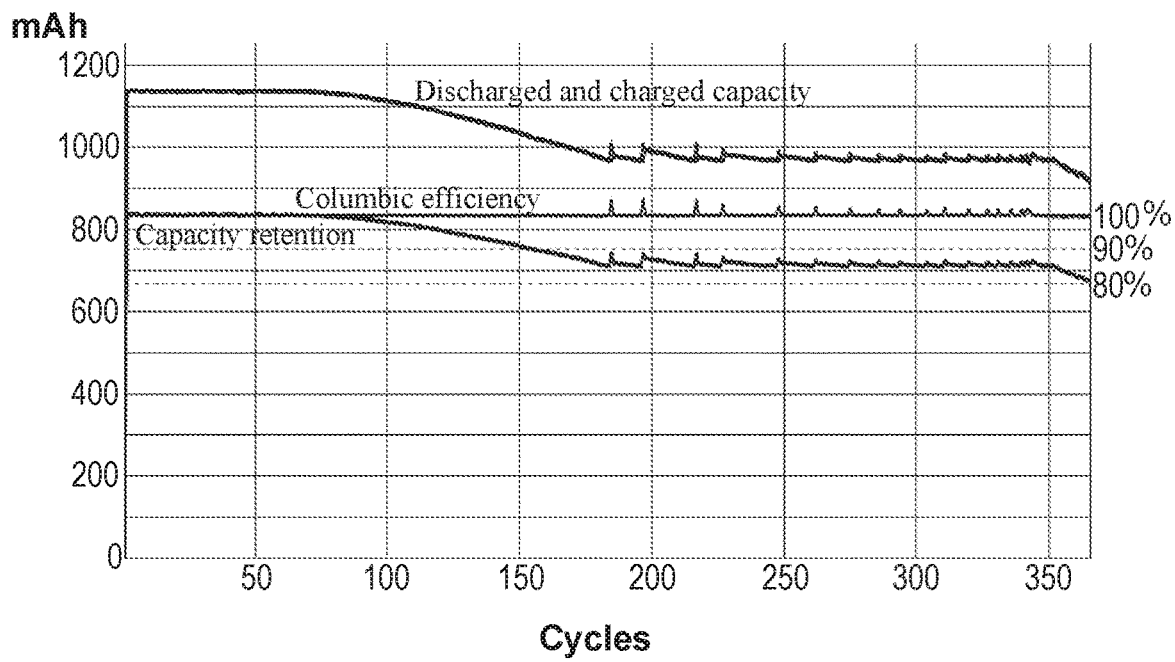
FIGS. 7A-7D are high-level schematic illustrations of experimental validations and characterizations of the system and its operation, according to some embodiments of the invention.
Figure 7B:
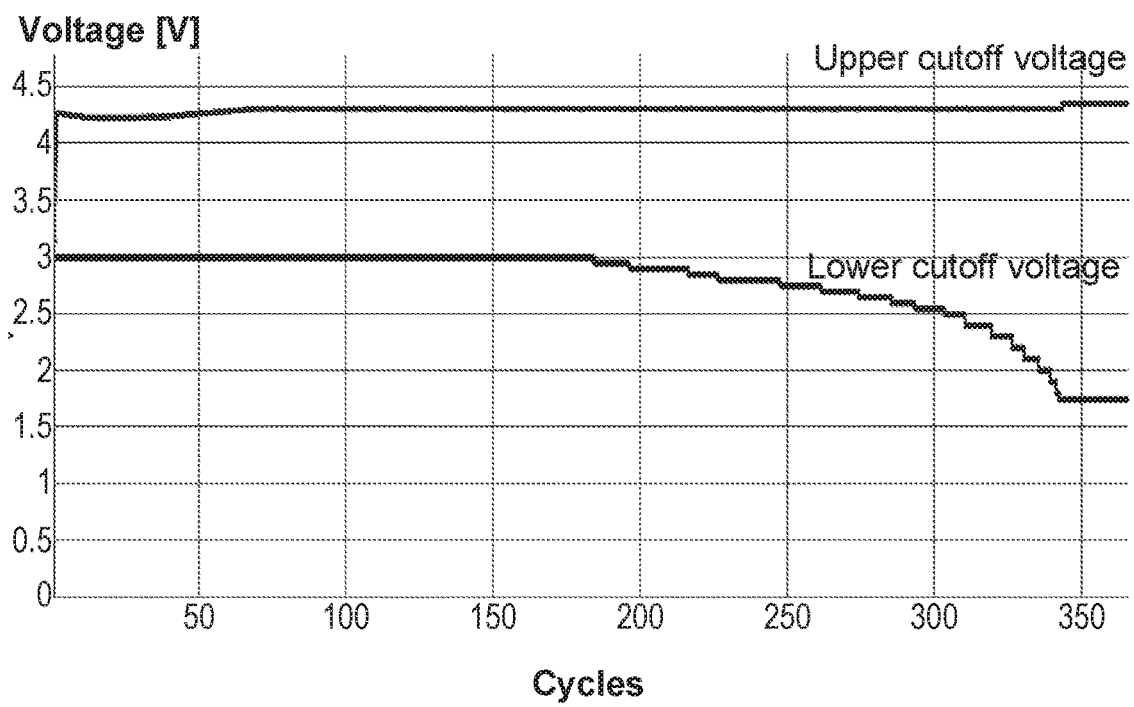
Figure 7C:
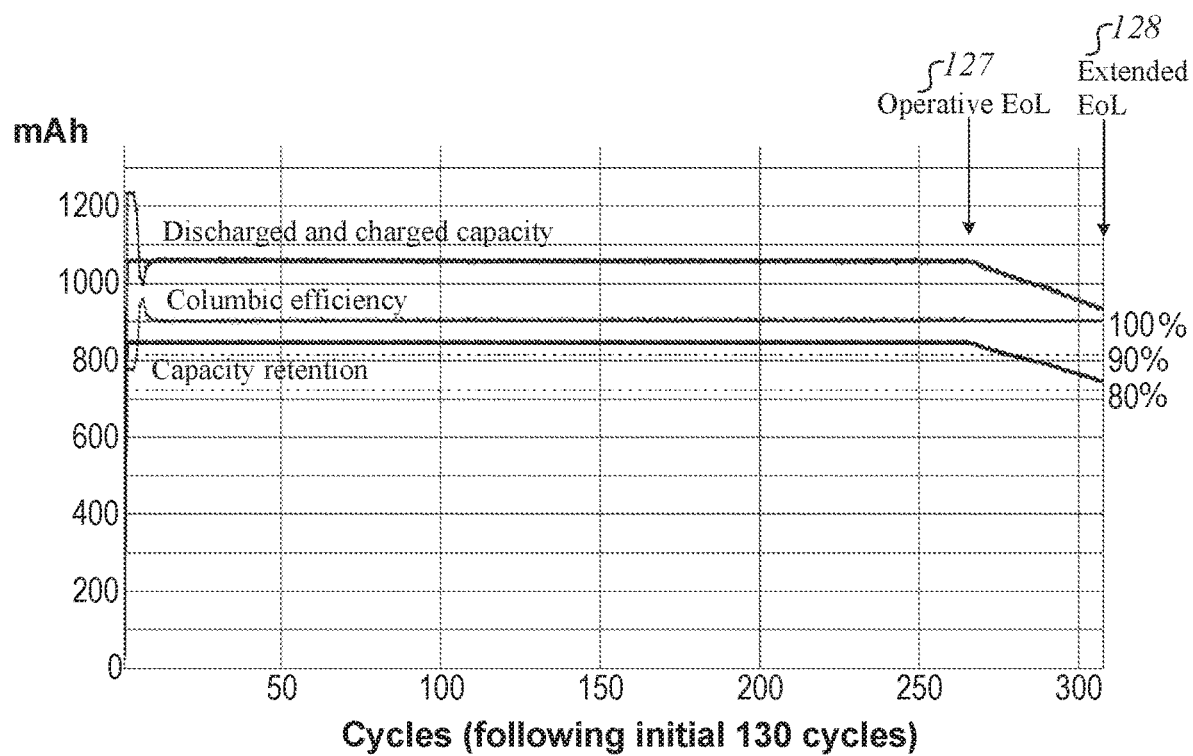

In various embodiments, operative EoL 127 may be extended 128 once device 80 is not able to sustain operative capacity 112 anymore, by allowing some degradation from operative capacity, as illustrated schematically in FIGS. 1 and 7C.

In certain embodiments, controller 110 may be further configured to monitor a state of health (SoH) of lithium-ion device 80 according to the decreasing lower voltage cutoff value, and optionally to provide a prediction of a cycling lifetime and/or of the operative EoL according to the monitored SoH.

It is noted that while operative EoL 127 corresponds to the number of cycles that allow supporting operative capacity 112 (e.g., by voltage compensation), prior art device EoL 71 corresponds to a predefined SoH degradation (e.g., between 60-80% of initial SoH). It is further noted that operative EoL 127 may be longer than prior art device EoL 71, e.g., in case device components are used beyond the extent of their use in the prior art and/or the operative capacity is set relatively low (e.g., below 90% of the rated, or maximal capacity). Operative EoL 127 may be further extended 128 by allowing additional capacity degradation from set operative capacity 112. In the latter case, controller 110 may be configured to allow operation of device 80 beyond operative EoL 127, at a degrading capacity lower than operative capacity 112, e.g., with respect to user preferences and operational procedures.

In certain embodiments, controller 110 may be further configured to set operative capacity 112 with respect to an anticipated use of lithium ion device 80 and to allocate specified capacity that is designated to provide additional energy from lithium-ion device 80 at predefined emergency cases, as further disclosed below (see, e.g., FIG. 8A-8C).

Figure 2:
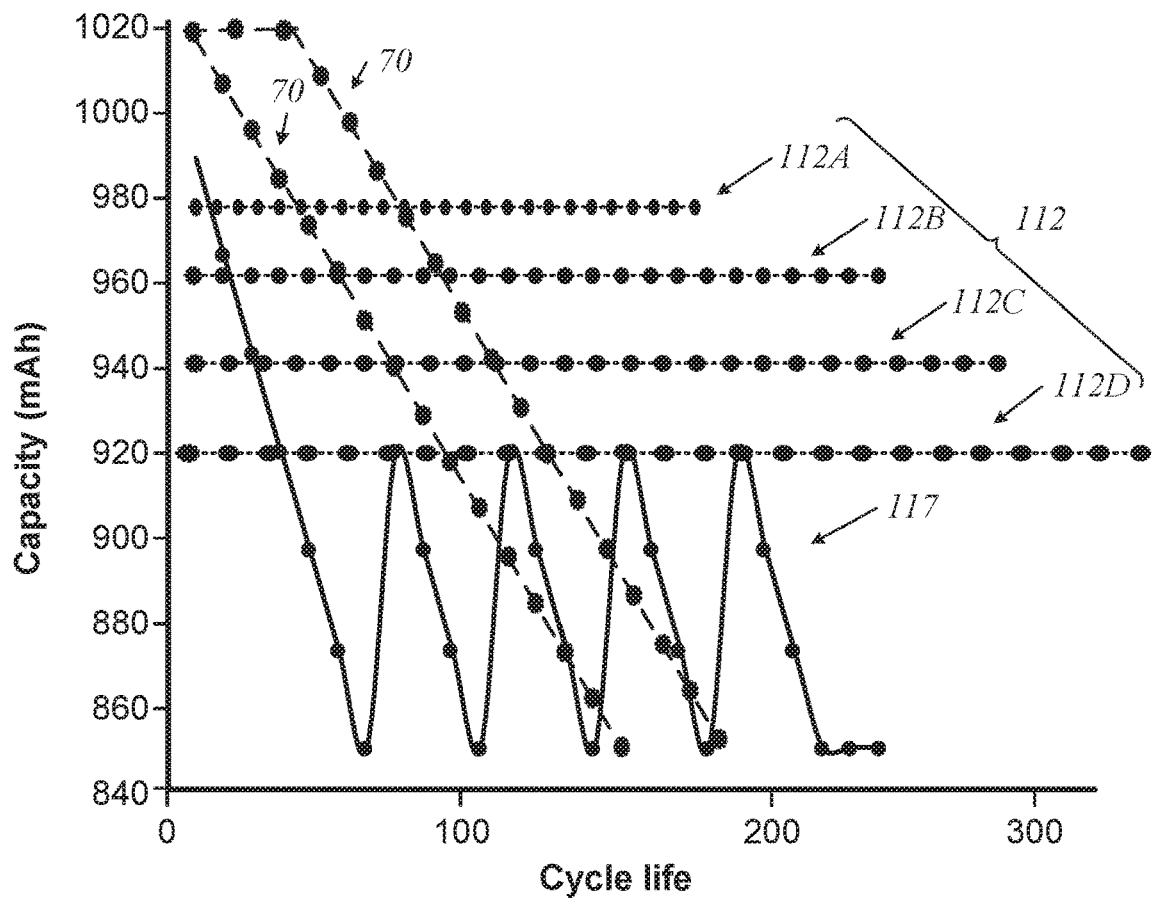
FIG. 2 is a high-level schematic illustration of three approaches that handle the device's capacity, according to some embodiments of the invention.
Figure 3A:
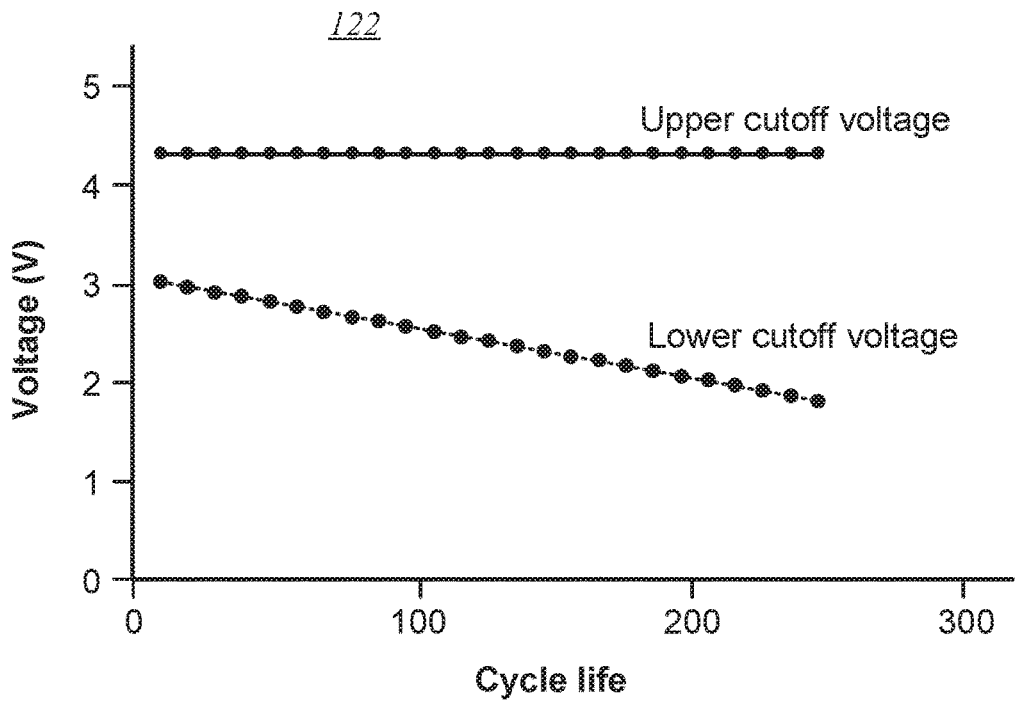
FIGS. 3A-3C are high-level schematic illustrations of the upper and lower voltage cutoff levels in the disclosed operation approach, according to some embodiments of the invention.
Figure 3B:
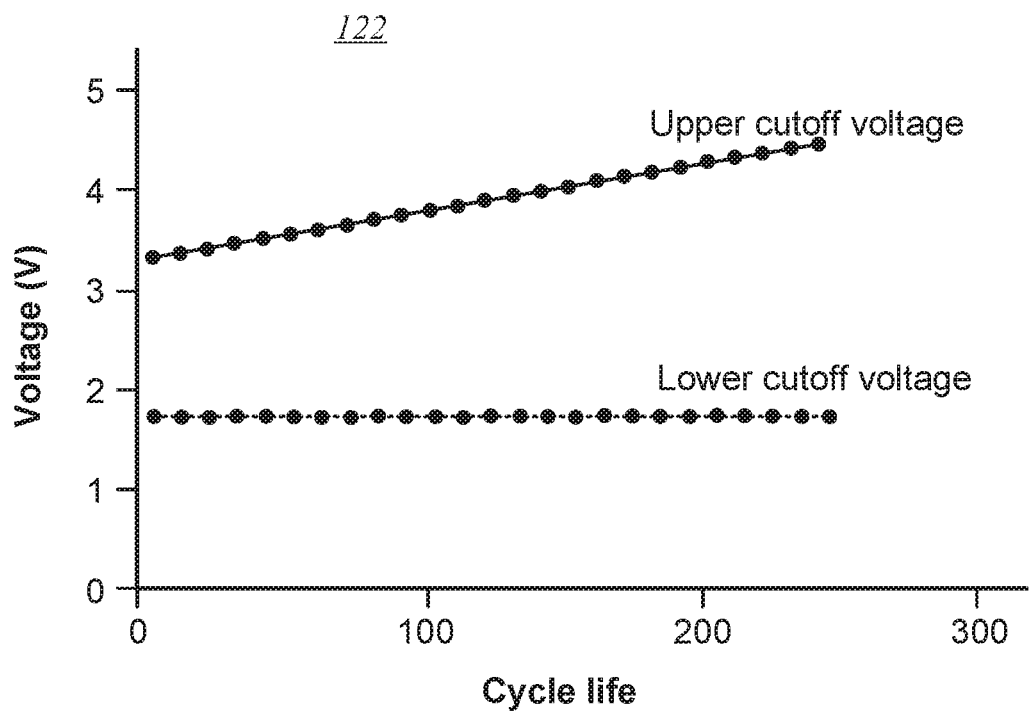
Figure 3C:
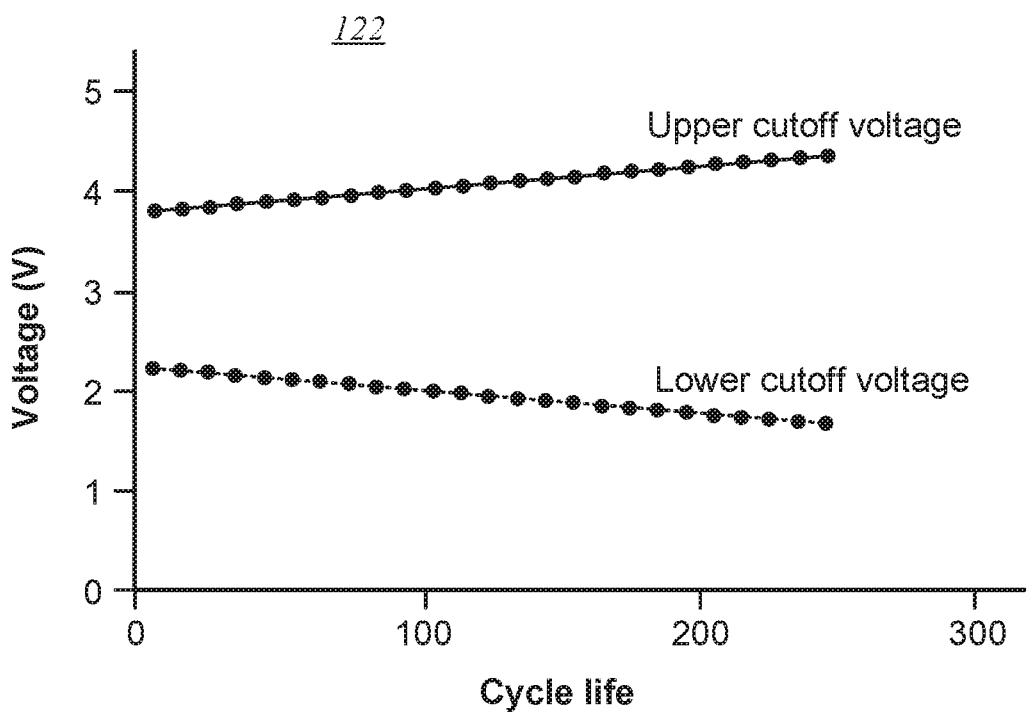

FIG. 2 is a high-level schematic illustration of three approaches 70, 112, 117 that handle the device's capacity, according to some embodiments of the invention. FIGS. 3A-3C are high-level schematic illustrations of the upper and lower voltage cutoff levels 122 in disclosed operation approach 112, according to some embodiments of the invention. In both figures, the graphs are schematic.

Prior art charging and discharging lithium-ion batteries usually require a voltage window between 3V, as the lower voltage, to 4.3V as the higher voltage (as a non-limiting example that may change with respect to the implemented device technology). During the cycling of the devices and, due to columbic efficiency that is lower than 100%, the device's capacity drops, as illustrated schematically in graphs 70 in FIG. 2. It is noted that in prior art use 70, the capacity degradation curve over cycling is shown schematically in two alternative graphs 70 depicting capacity degradation from the start of operation and initial constant capacity followed by capacity degradation—which are prior art options that depend on operation scenarios and battery technology. It is further noted that disclosed embodiments may be applied to any type of lithium ion device 80, modifying the corresponding voltage cutoff values that result from the respective device chemistry involved.

Advantageously, while prior art capacity degrades at a constant voltage window, in disclosed embodiments the operative capacity is maintained constant and/or controllable, extending cycling lifetime, with the voltage window being modified to support the constant (and/or controllable) operative capacity. Advantageously, such operation is more predictable, easier to manage for one or many energy storage devices and provides more flexibility and full utilization of the energy storage devices.

U.S. Pat. No. 10,122,042, incorporated herein by reference in its entirety, teaches using a dynamic voltage window for lithium ion device, in which, during operation, voltage ranges are initially set to be narrow, and are broadened upon device deterioration to maximize the overall cycling lifetime—as illustrated schematically in graph 117 in FIG. 2. For example, voltage window broadening may be carried out whenever the retention slope of the capacity reaches 85% of the capacity of the first cycles, with the voltage window being sequentially broadened until a voltage lower limit (e.g., 1.8V) is reached, e.g., to conform with safety requirements. Correspondingly, in graph 117, the device capacity fluctuates with the consecutive broadening of the operation voltage window. While effective in extending the device cycling lifetime, methods represented by graph 117 may require a sophisticated monitoring system that is not applicable in all cases. It is noted that initial constant capacity may occur under such scenarios (similar to alternative prior art graphs 70), which is note shown, for simplicity reasons.

In certain embodiments, represented by graphs 112 in FIG. 2, device cycling lifetime may be extended using simpler controller 110, by setting the voltage top limit (e.g., at 4.3V), setting the effective capacity to be constant (e.g., at 1 Ah), and allowing the voltage lower cutoff limit adjust to the set capacity. Once the actual capacity starts to decrease, the lower cutoff voltage of device 80 starts to decrease to compensate for the capacity lost, as illustrated schematically in graph 122 of FIG. 3A and/or the upper cutoff voltage of device 80 starts to increase to compensate for the capacity lost, as illustrated schematically in graph 122 of FIG. 3B or a combination thereof is implemented, as illustrated schematically in graph 122 of FIG. 3C. Controller 110 maintains the set capacity constant, providing the user with a digital (all or none) device operation indication.

For example, assuming device operation between 1.8V-4.3V (a non-limiting example, various technologies provide different ranges, and disclosed embodiments may be adjusted accordingly)—prior art approach 70 uses a constant voltage window form 1.8V-4.3V to operate the lithium ion device, while the approach of U.S. Pat. No. 10,122,042, illustrated schematically and in a non-limiting manner in graph 117 uses the same voltage window 1.8V-4.3V but in this approach the lower cutoff voltage is reduced stepwise from 3V to 1.8V dynamically according to specified voltage steps. While using the same voltage window 1.8-4.3V, in contrast to these approaches, disclosed systems 100, represented schematically in graph 112, maintain a constant capacity of lithium ion device 80, allowing the upper or/and lower cutoffs voltages to vary as a result of cell component degradation, rather than being fixed as in approach 70 or being broadened between specified steps as in approach 117. Advantageously, disclosed approach 112 extends the cycling lifetime of lithium ion device 80 with respect to approach 70, and is simpler to implement than approach 117, while additionally providing the user with the set capacity and the digital nature (on/off, e.g., operable or not operable) of lithium ion device 80, as represented in system 100.

Moreover, FIG. 2 illustrates a range of options for set capacity, represented schematically by graphs 112A, 112B, 112C, 112D, with corresponding resulting device cycling lifetimes. In certain embodiments, controller 110 may be configured to optimize the set capacity limitation (e.g., 70%, 80% or 90%, or any other value from the rated capacity) as a function of the working window (upper and lower cutoffs and their allowed changes, as illustrated e.g., in FIGS. 3A-3C), directly affecting the cycle life. While the capacity is set to be constant in all cases 112A-112D, the cycling lifetime changes as it depends on the used capacity (percentage of rated capacity) defined by the used voltage window, generally increasing with decreased set capacity, as lower set capacity embodies higher tolerance to device component degradation. For example, using the non-limiting values provided as an example in FIG. 2, set capacities of 980 mAh, 960 mAh, 940 mAh and 920 mAh, correspondingly 96%, 94%, 92% and 90% of the rated capacity of 1020 mAh of lithium-ion device 80, result in cycling lifetimes of 180, 220, 290 and ca. 380, respectively, as illustrate schematically by graphs 112A, 112B, 112C, 112D. Accordingly, the set capacity may be selected with respect to a specified required cycling lifetime of lithium-ion device 80.

It is noted that decreasing lower voltage cutoff, increasing upper voltage cutoff, and both, illustrated schematically in FIGS. 3A, 3B and 3C, respectively, may be carried out during discharging, charging and charging/discharging procedures, respectively. For example, increasing upper voltage cutoff may be carried out during charging and decreasing lower voltage cutoff may be carried out during discharging.

In certain embodiments, illustrated schematically in graph 122 of FIG. 3A, device cycling lifetime may be extended using controller 110, by setting the voltage upper limit (e.g., at 4.3V), setting the effective capacity to be constant (e.g., at 1 Ah), and allowing the voltage lower cutoff limit adjust to the set capacity. Once the actual capacity starts to decrease, the lower cutoff voltage of device 80 starts to decrease to compensate for the capacity lost.

In certain embodiments, illustrated schematically in graph 122 of FIG. 3B, device cycling lifetime may be extended using controller 110, by setting the voltage bottom limit (e.g., at 1.8V), setting the effective capacity to be constant (e.g., at 1 Ah), and allowing the voltage upper cutoff limit adjust to the set capacity. Once the actual capacity starts to decrease, the upper cutoff voltage of device 80 starts to increase to compensate for the capacity lost.

In certain embodiments, illustrated schematically in graph 122 of FIG. 3C, device cycling lifetime may be extended using controller 110, by starting device operation as raised voltage bottom cutoff and reduced voltage upper cutoff (e.g., 2.2V and 3.8V, respectively, compared with 1.8V and 4.2V, respectively), setting the effective capacity to be constant (e.g., at 1 Ah), and allowing the voltage upper cutoff limit and the voltage bottom cutoff limit adjust to the set capacity. Once the actual capacity starts to decrease, the upper cutoff voltage of device 80 starts to increase and the lower cutoff voltage of device 80 starts—to decrease to compensate for the capacity lost. Any of the disclosed options may be combined. It is noted that the values are provided as illustrative examples, and may be adjusted according to device technology, system configurations and operation requirements.

In any of the disclosed embodiments, the provided capacity does not decrease towards device EoL, but stays constant until the device reaches a specified target SoH (e.g., any of 60%, 70%, 80% or other values). It is noted that the extension of the device cycling lifetime results from operation at operative capacity 112 that is lower than the rated capacity, resulting in shallower DoD and/or from exhausting lithium that is kept in anodes, cathodes, electrolyte or combinations thereof or other device components. In various embodiments, degradation of various device components (e.g., anodes, cathodes, electrolyte, etc. or combinations thereof). In disclosed embodiments, the device cutoff voltages may change, the operative device capacity remains at the set value (or controlled according to user specified slopes or expected use patterns), so that component degradation is implicit, and the operative device EoL (or target device SoH) coincides with the EoL of the respective component. For example, in various embodiments, operative EoL 127 may be determined by anode EoL, cathode EoL, EoL of any other cell or battery components, or combinations thereof.

It is further noted that similar examples are valid when using lithium ion device 80 with a different range of voltage cutoff values, e.g., 3V-4.3V rather than 1.8V-4.3V, as more typical to devices with carbon-based anodes. Disclosed embodiments may be modified accordingly, to be operable within the different voltage window.

Optionally, monitoring the lower and/or upper voltage cutoff values of device 80 may provide a state of health (SoH) indication and/or prediction tool(s), that may predict the cycle life of lithium-ion device 80 and provide warnings concerning approaching target SoH values and/or operative EoL 127. It is noted that only the respective lower and/or upper voltage cutoff values are required for the SoH indication and not the actual discharging/charging voltages, as the actual discharging/charging may be partial due to partial use of device 80. For example, with respect to a full range of 1.8V-4.3V, a partial range of 2V-4.3V with increased lower voltage cutoff value may be used to indicate the shortening of the cycling lifetime for device 80 (even if actual discharging is carried out down a higher voltage value, e.g., 3V, due to partial use of device 80).

It is noted that controller 110 may be applied to device 80 as a whole, or to specific modules and/or cells in device 80, which have metalloid-based anodes. It is further noted that charging and/or discharging parameters may be adjusted by controller 110 as disclosed, depending on the exact implementation details (e.g., which cutoff voltage is allowed to change). In case charging parameters change, parameters of either or both constant current (CC) and constant voltage (CV) stages may be modified, as well as parameters applicable to other charging methods such as pulse or boost charging, or other methods.

In certain embodiments, a similar approach may be implemented for lithium ion devices 80 with carbon-based anodes and/or metalloid-decorated carbon-based anodes, for a correspondingly narrow range of cutoff voltages, e.g., with initial lower and upper voltage cutoff values of 3V and 4.3V, respectively, for carbon-based anodes. It is noted that in case of carbon-based anodes, the difference between the rated capacity and the operative capacity may correspondingly be smaller than for metalloid-based anodes.

It is noted that in any of the embodiments, controller 110 may be configured to perform partial charging and/or partial discharging of lithium ion device 80, e.g., according to user specifications and/or load requirement. Specifically, controller may be configured to operate lithium ion device 80 within a partial range of the available set operative capacity 112, e.g., between any of 10%-90%, 20%-80%, 30%-70%, 40%-80%, 50%-90% or any other partial range. Accordingly, either charging and/or discharging may be partial with respect to set operative capacity 112 and/or the value of set operative capacity 112 may be modified according to user or load requirements, and voltage cutoffs may be adapted accordingly.

Figure 4A:
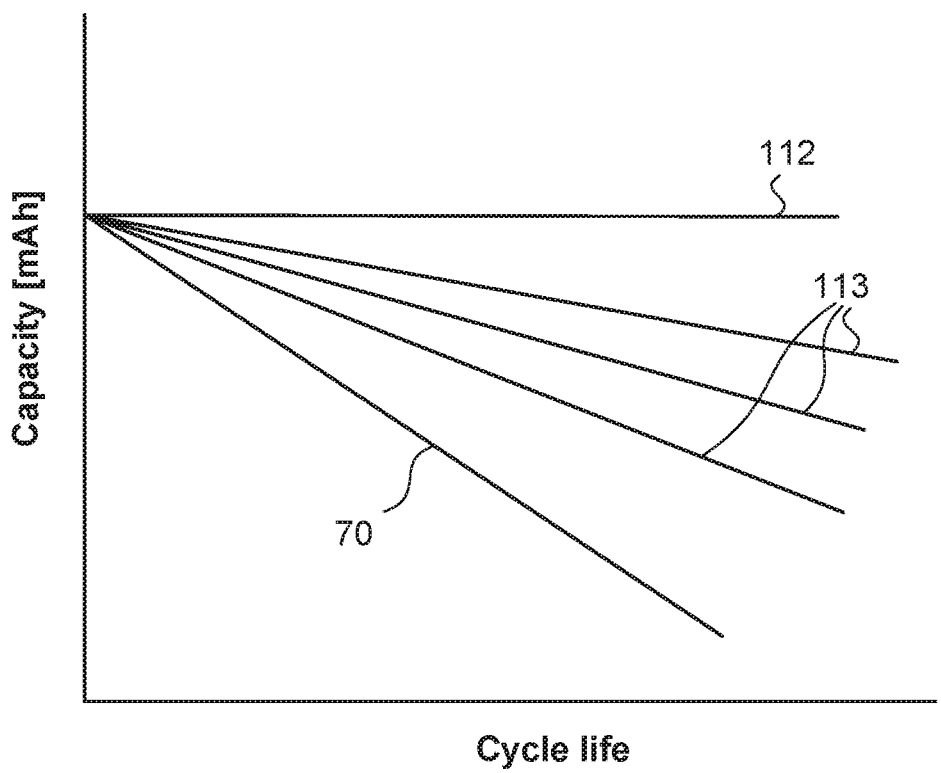
FIGS. 4A-4C are high-level schematic illustrations of intermediate approaches with corresponding intermediate decreasing lower cutoff voltages, respectively, according to some embodiments of the invention.
Figure 4B:
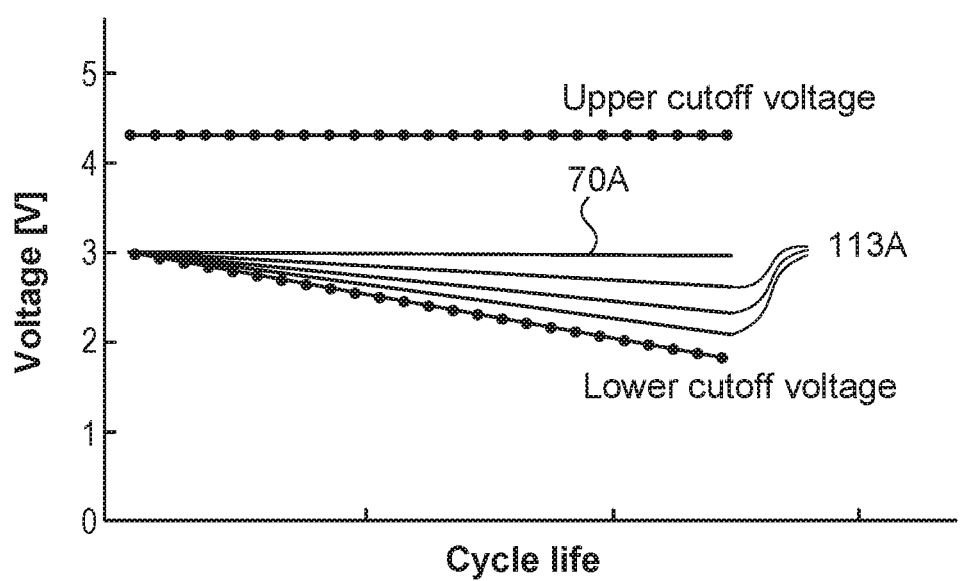
Figure 4C:
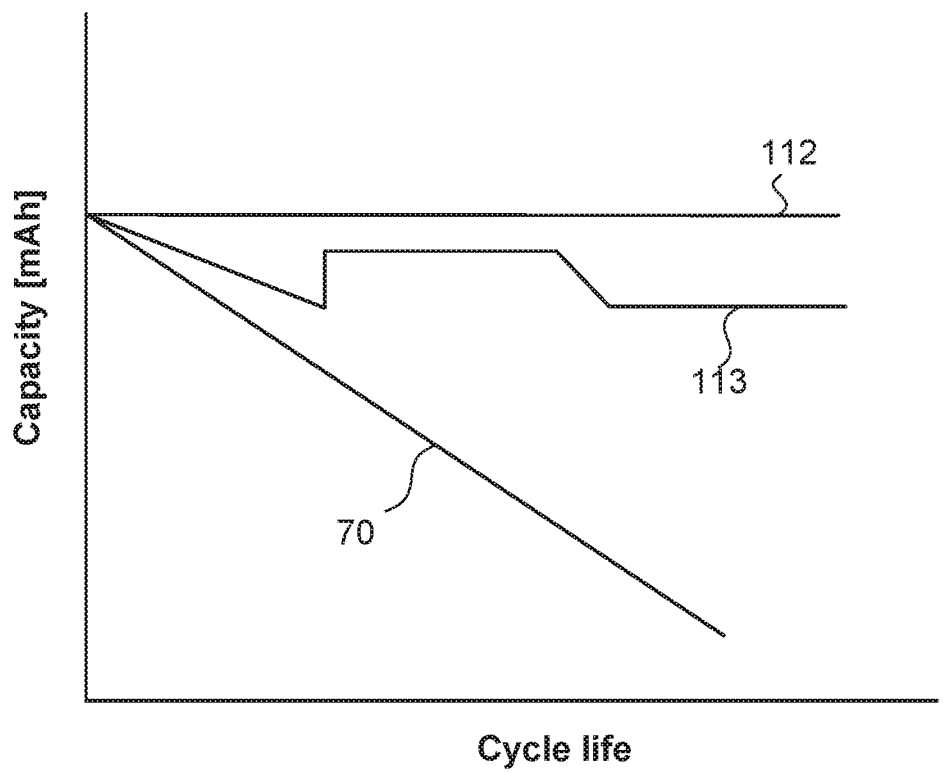

FIGS. 4A-4C are high-level schematic illustrations of intermediate approaches 113 with corresponding intermediate decreasing lower cutoff voltages 113A, respectively, according to some embodiments of the invention. In both figures, the graphs are schematic. In certain embodiments, the set capacity (represented schematically in capacity graph 112 in FIG. 4A and upper and lower cutoff voltages in FIG. 4B, which resemble in the schematic example the lines depicted in FIG. 3A) may be set along a mildly degrading line 113, that is intermediate between disclosed constant capacity 112, and prior art degrading capacity 70, which degrades according to the unconstrained device performance. FIG. 4C illustrates schematically intermediate approaches 113 with changes applied to the operative capacity, between periods of mildly degrading capacity and periods of constant capacity.

In intermediate approaches 113, the capacity may be set to degrade along a specified trajectory (e.g., a straight line) with resulting decreasing lower cutoff voltages and/or increasing upper cutoff voltages 113A rather than prior art constant cutoff voltages 70A (depicted schematically in FIG. 4B). In intermediate approaches 113, device degradation may thus be split between moderate capacity degradation and moderate internal component degradation. For example, the slope of decreasing lower cutoff voltages and/or increasing upper cutoff voltages 113A may be between 20% and 90%, or between 50%-80% of the slope of decreasing lower cutoff voltages and/or increasing upper cutoff voltages that occur when using disclosed set and constant device capacity. Controller 110 may be configured to manage the set capacity as constant or as moderately degrading, e.g., according to user specifications. Specifically, controller 110 may be configured to modify the set constant capacity value into a moderately decreasing capacity value that is higher than a capacity degradation rate of lithium-ion device 80, while decreasing the lower voltage cutoff value and/or increasing the upper voltage cutoff.

FIG. 4C schematically illustrates an example for a mixed mode, combining periods of mildly degrading capacity and periods of constant capacity. Intermediate approaches 113 may comprise combinations and capacity values that are intermediate between constant capacity 112 and prior art degrading capacity 70, possibly including multiple phases with different capacity degradation rates and/or constant operative capacity values. It is noted that operative EoL 127 corresponds to the number of cycles for which voltage compensation for capacity changes in intermediate approaches 113 is available, while extended device EoL 128 corresponds to the additional number of cycles until the SoH reaches a predefined percent of the rated capacity (e.g., between 60-80%), below set operative capacity 112 (see, e.g., FIGS. 1 and 7C).

Figure 5:
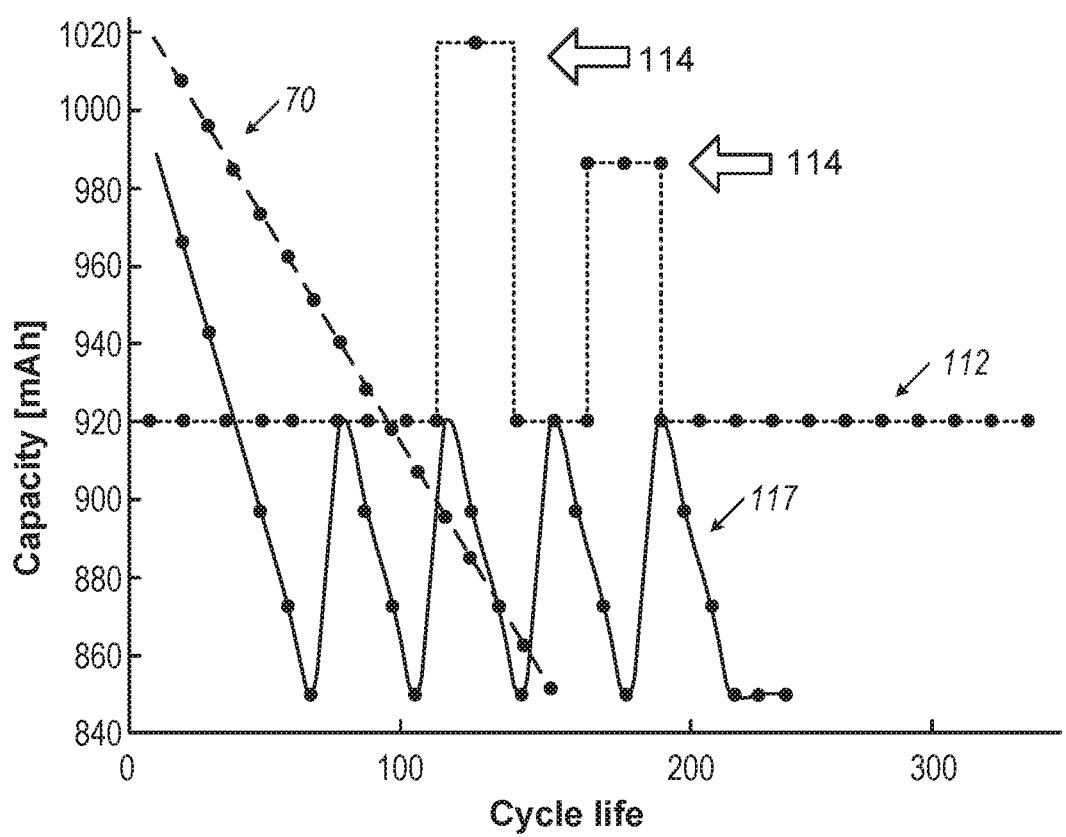
FIG. 5 is a high-level schematic illustration of three approaches that handle the device's capacity, including optional additional energy provision from the lithium-ion device at predefined emergency cases, according to some embodiments of the invention.
Figure 6A:
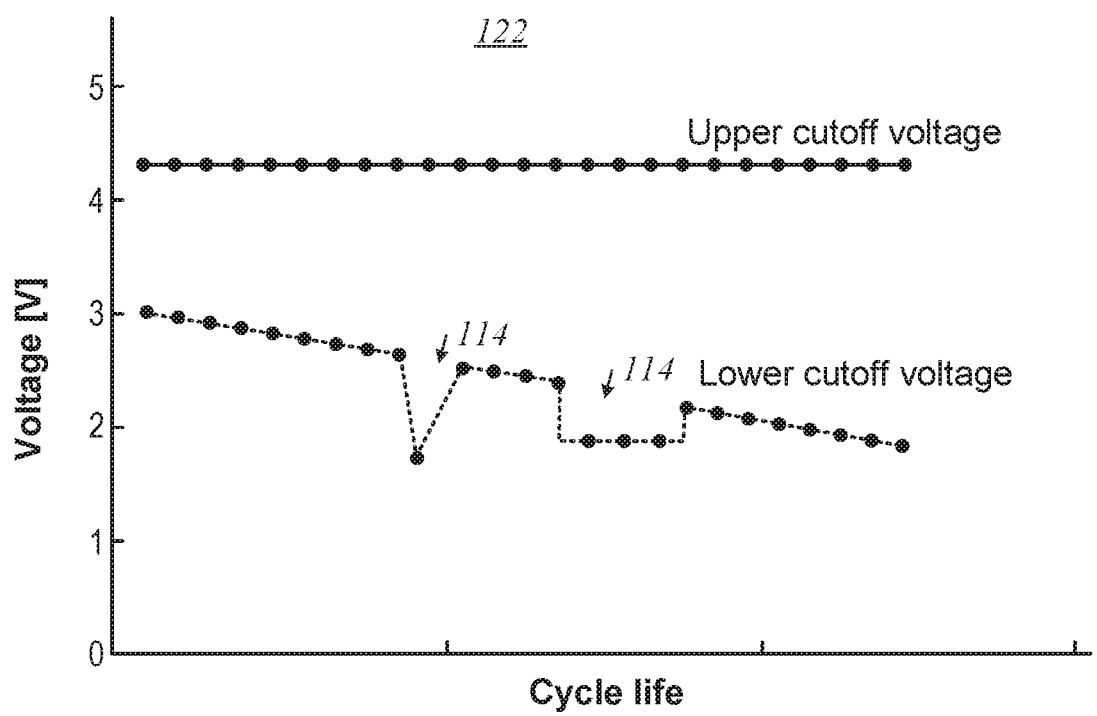
FIGS. 6A and 6B are high-level schematic illustrations of the upper and lower voltage cutoff levels in the disclosed operation approach, according to some embodiments of the invention.
Figure 6B:
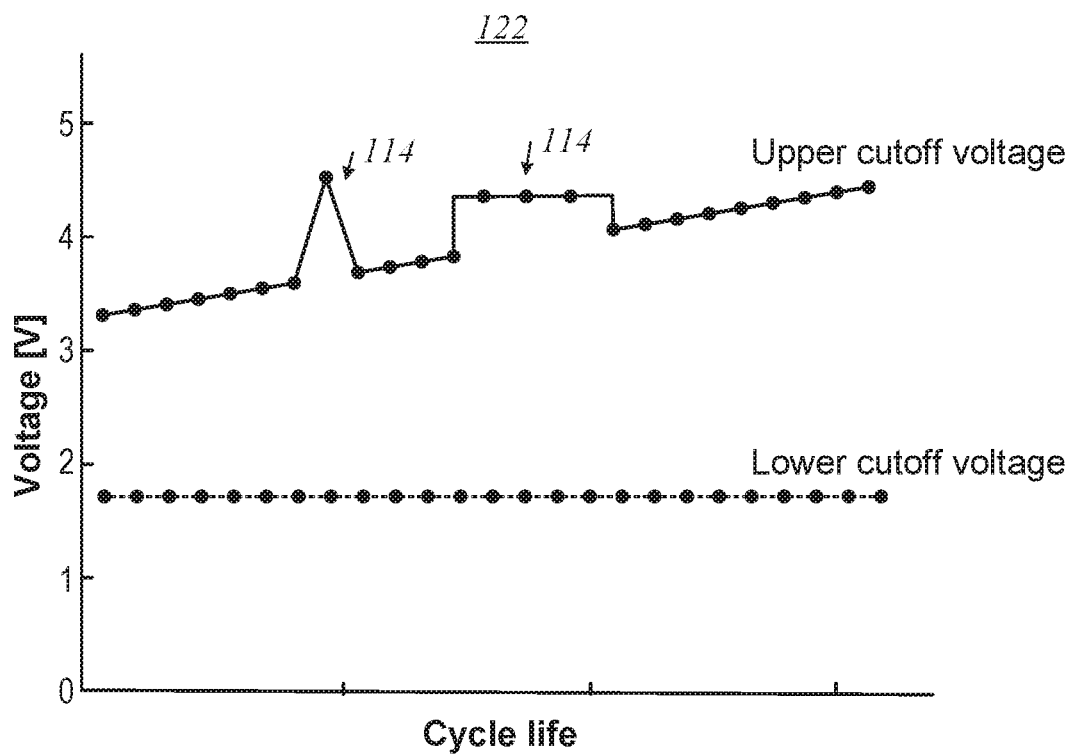

FIG. 5 is a high-level schematic illustration of three approaches 70, 117, 112 that handle the device's capacity, the latter including optional additional energy provision from lithium-ion device 80 at predefined emergency cases, according to some embodiments of the invention. FIGS. 6A and 6B are high-level schematic illustrations of the upper and lower voltage cutoff levels 122 in disclosed operation approach 112, according to some embodiments of the invention. In both figures, the graphs are schematic.

In certain embodiments, predefined emergency cases that require exceptional additional power or/and energy (e.g., for range extension in electric vehicles, for emergency cases in cellular phones, for finishing an operation using a tool) may be handled by system 100 through temporal deviation from the set capacity value, indicated schematically by numeral 114 denoting exceptional energy requirements for pre-defined emergency cases in FIGS. 5, 6A and 6B. In such cases, controller 110 may be configured to allowing deviation from the set capacity value (indicated by line 112 in FIG. 5) and/or from set decreasing lower voltage cutoff value and/or increasing upper voltage cutoff (shown schematically in FIGS. 6A and 6B) to temporarily provide required additional energy from lithium-ion device 80. Such cases utilize the actual higher capacity of device 80 which is kept for extending the device's cycling lifetime in regular operation—to provide exceptional emergency requirements (at the cost of shortening the cycling lifetime of device 80). As disclosed below, in certain embodiments, an emergency capacity range may be predefined and kept for optional use in addition (or possibly as part of) set operative capacity 112. The emergency capacity range may be defined to minimize reduction in the device's cycling lifetime as result of using the emergency capacity.

In certain embodiments, controller 110 may be configured to receive allocation instruction from the user as to what amount of energy may be required for emergency cases, and to determine the set capacity accordingly (see, e.g., lines 112A-112D in FIG. 2 as schematic alternatives), to maintain the capability of providing the additional energy of required. It is noted that the additional energy may be supplied by either temporarily further decreasing the lower cutoff voltage 114 (FIG. 6A), e.g., in a discharging state, and/or by further increasing the upper cutoff voltage 114 (FIG. 6B), e.g., in a charging state.

The specific, non-limiting examples shown in FIGS. 5, 6A and 6B, illustrate schematically a use scenario in which the user requires short-term additional energy about cycle 130 of device 80, temporarily increasing the delivered energy (and capacity) for one cycle, and then again requiring short-term additional energy about cycle 180 of device 80 temporarily increasing the delivered energy (and capacity) for three cycles (FIG. 5). It is noted that the increase in capacity may be selected according to user requirements, e.g., in the latter case the capacity is lower than the capacity in the former case. Correspondingly, the operation voltage window may be broadened in such cases by reducing the lower cutoff voltage (FIG. 6A), e.g., during discharging, and/or by increasing the upper cutoff voltage (FIG. 6B), e.g., during charging—to provide the additional energy and capacity. It is noted that the details of broadening the voltage window, determined be controller 110, may be calculated in a dynamic and ad hoc manner, depending on device SoH.

FIGS. 7A-7D are high-level schematic illustrations of experimental validations and characterizations of system 100 and its operation, according to some embodiments of the invention. Different operation scenarios were applied, as explained below, using cells charged using CCCV (a constant-current stage followed by a constant-voltage stage in each cycle) mode, at 8 C charging and 1 C discharging rates.

FIGS. 7A and 7B illustrate the capacity and the voltage cutoff values (during charge and discharge), respectively, using operation scheme 117 described in U.S. Pat. No. 10,122,042. The initial capacity of the cell was ca. 1140 mAh, the cell was operated at an initial stage without voltage window regulation, with the capacity starting to decline around cycle 80. Around cycle 130, the cell retention reached 94% from the rated capacity (ca. 1170 mAh). Around cycle 185, at 85% retention, dynamic voltage procedure 117 was applied, and the voltage window was increased step-wise by reducing, step-wise, the lower cutoff from 3V down to 1.8V around cycle 350, which was defined as EoL. FIG. 7A illustrates the resulting discharged and charged capacity, the columbic efficiency and the capacity retention, with characteristic spikes indicating the step-wise broadening of the operative voltage windows disclosed in U.S. Pat. No. 10,122,042, while FIG. 7B illustrates the respective upper and lower cutoffs, with the lower cutoff decreasing step-wise as disclosed in U.S. Pat. No. 10,122,042.

Figure 7D:
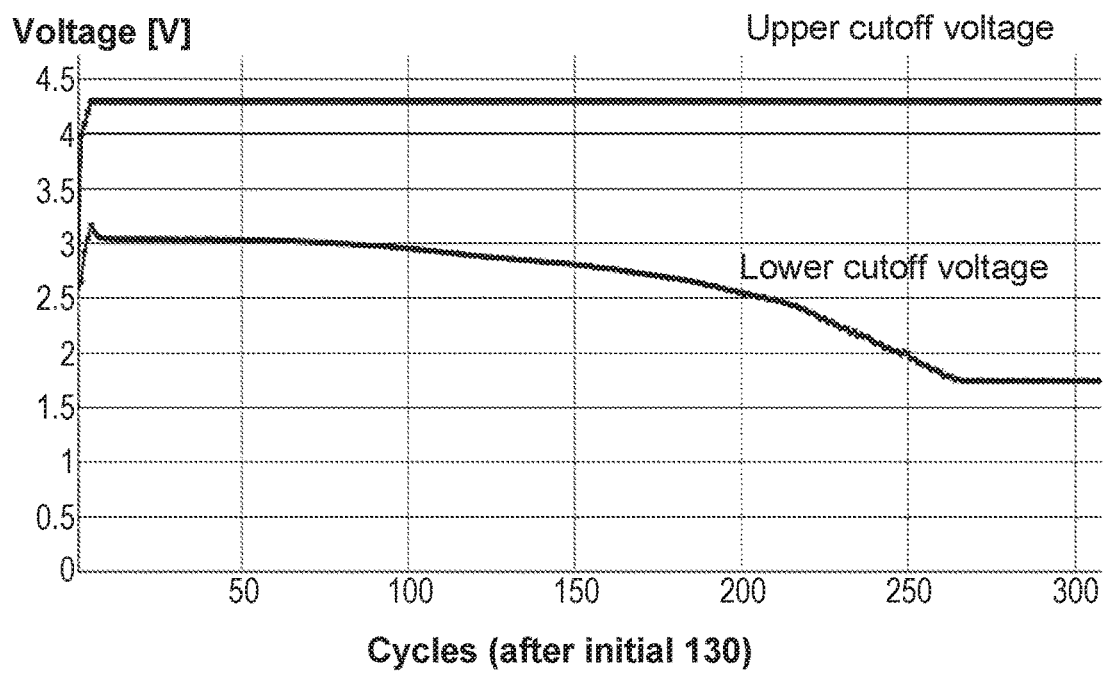

FIGS. 7C and 7D illustrate the capacity and the voltage cutoff values (during charge and discharge), respectively, using disclosed operation scheme 112 at a similar scenario. The initial capacity was ca. 1065 mAh (ca. 94% from the rated capacity of 1140 mAh, corresponding to ca. cycle 130 of the experiment provided in FIGS. 7A and 7B, as denoted schematically on the x axis), and the capacity was maintained constant over ca. 250 cycles, in contrast to prior at and previously presented operation schemes 70, 117, respectively. It is noted that a similar cycling lifetime is achieved with the disclosed operation scheme. FIG. 7C illustrates the resulting discharged and charged capacity, the columbic efficiency and the capacity retention, which are kept constant over most of the device's cycling lifetime, providing the user a clear and uniform capacity value, while FIG. 7D illustrates the respective upper and lower cutoffs, with the lower cutoff decreasing smoothly, as the operative capacity is kept constant (and the device's component degrade). FIG. 7C also illustrates, in a non-limiting example, operative EoL 127 as the number of cycles after which the operative capacity cannot by further maintained by voltage cutoff value adjustments, and extended EoL 128 as the extended cycling lifetime achieved by allowing the device capacity to degrade below the set operative capacity value.

Figure 8A:
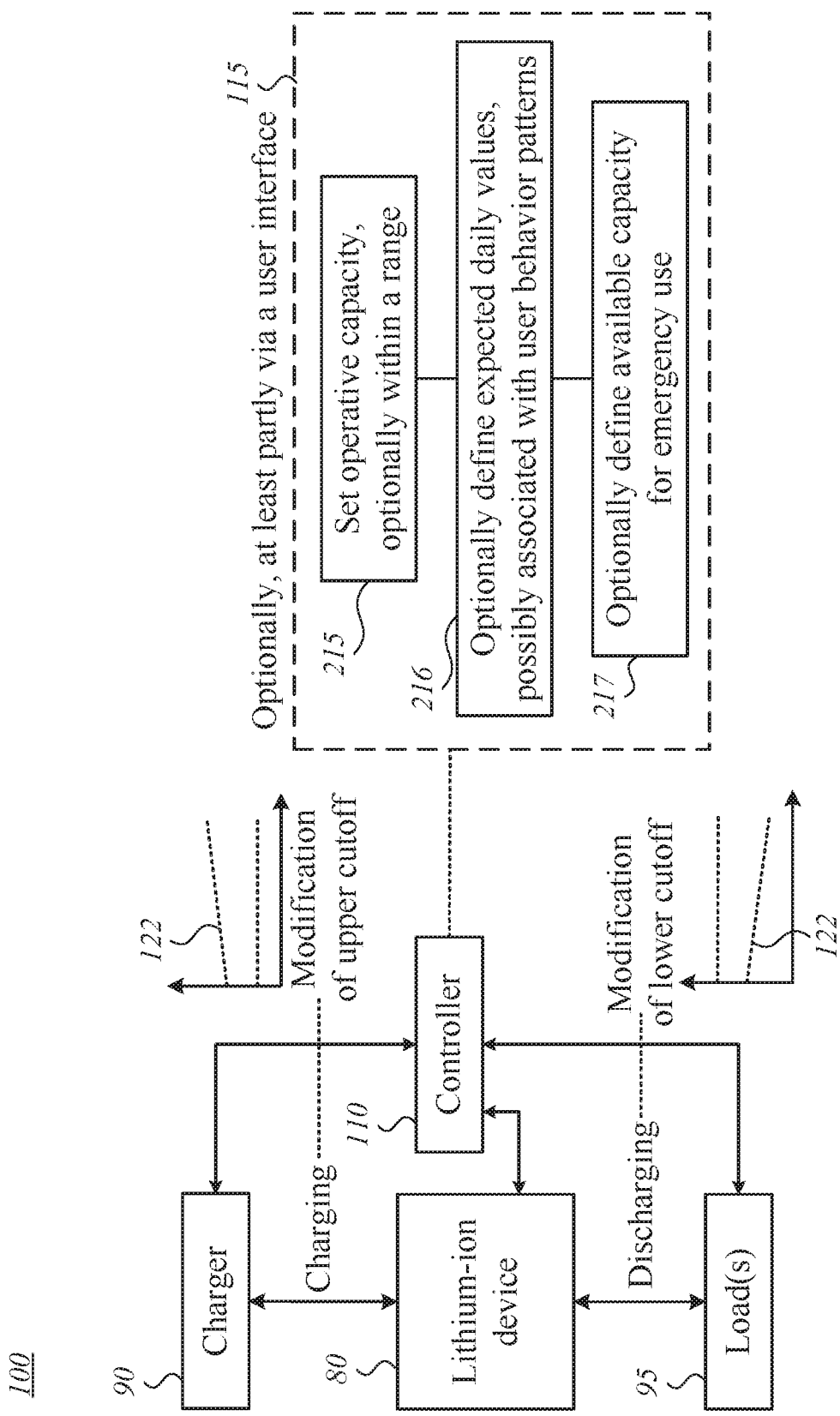
FIGS. 8A-8C are high-level schematic illustrations of a range of optional ways to set and fine-tune the capacity, optionally incorporating user input, according to some embodiments of the invention.
Figure 8B:
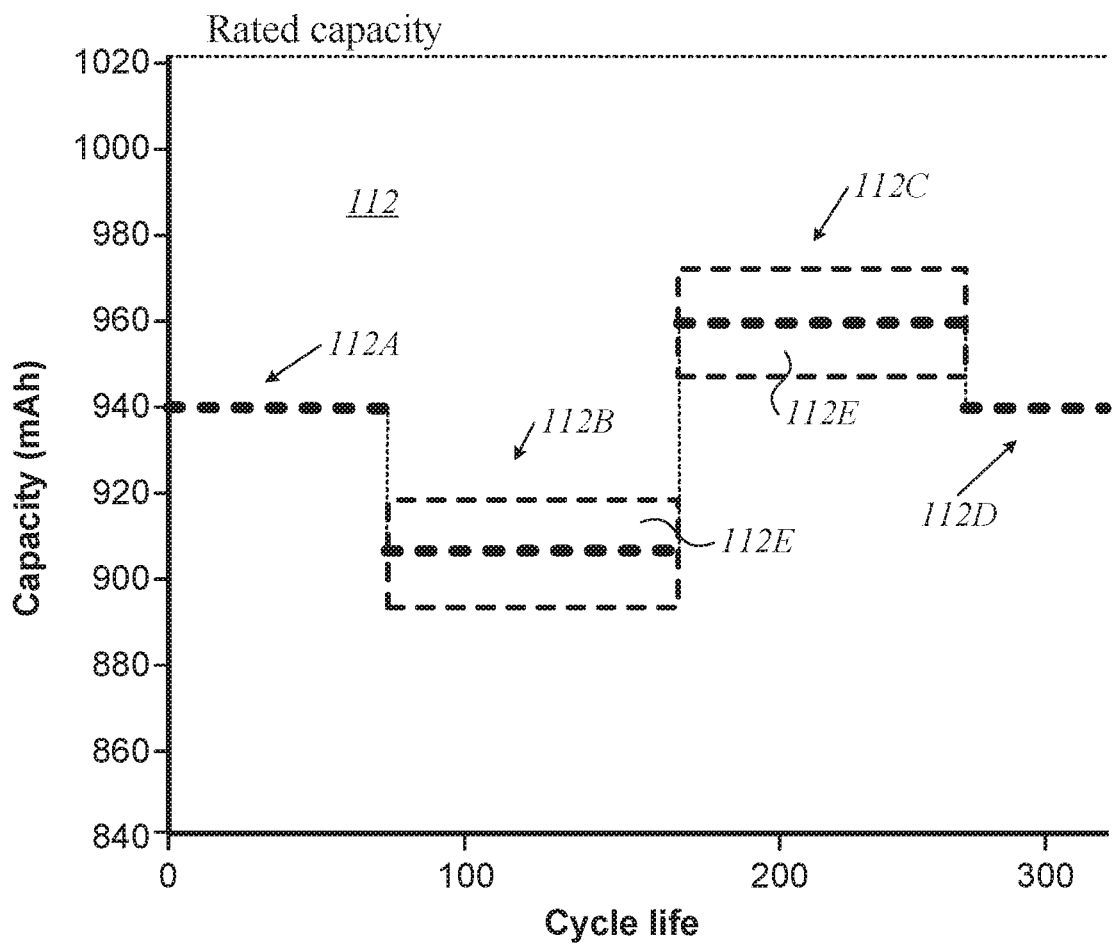
Figure 8C:
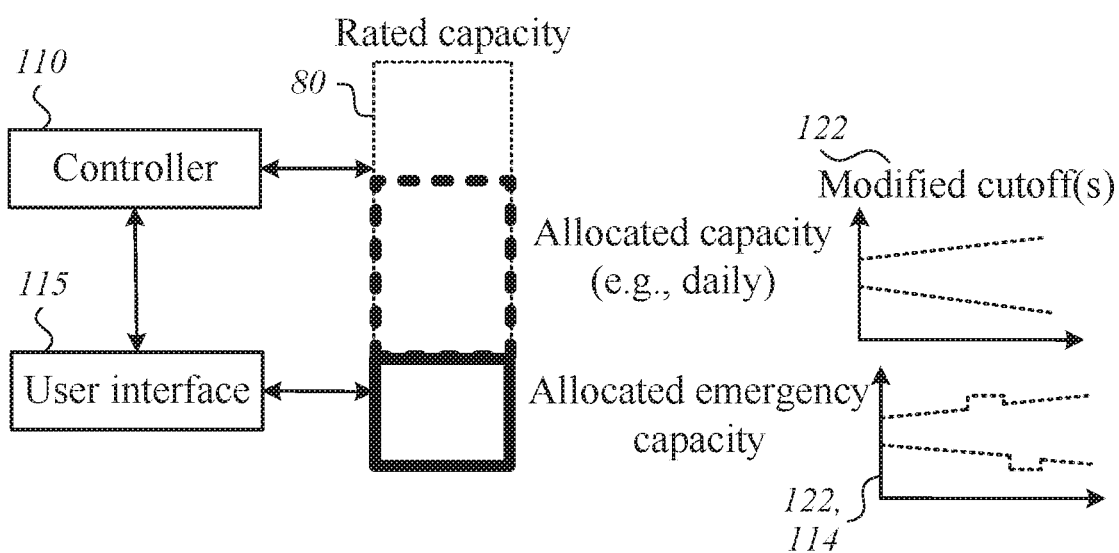

FIGS. 8A-8C are high-level schematic illustrations of a range of optional ways to set and fine-tune the capacity, optionally incorporating user input, according to some embodiments of the invention.

FIG. 8A schematically illustrates system 100, with controller defining upper and lower voltage cutoff values for charging and discharging lithium ion device 80, respectively, optionally, at least partly according to user preferences provided via a user interface 115.

For example, in certain embodiments, controller 110 (optionally according to preferences obtained via user interface 115), may periodically define different set capacity values 215, as illustrated schematically in FIG. 8B by set capacities 112A, 112B, 112C, 112D. For example, low capacity value 112B may be set under specified operation conditions (e.g., in relation to the state of lithium ion device 80 and/or load 95 and/or available charger 90), for example to prolong the cycling lifetime of lithium ion device 80, while high capacity value 112C may be set under different specified operation conditions (e.g., in relation to the state of lithium ion device 80 and/or load 95 and/or available charger 90), for example to provide high performance and supply high energy demands under certain circumstances. It is noted that any of set capacities, which are all lower than the rate capacity of lithium ion device 80, may be defined within a specified range 112E rather than being set a single value, due to various considerations, such as operation procedures and requirements of any of lithium ion device 80, load 95, charger 90, controller 110, etc. It is noted that range 112E may include small deviations of the actual capacity from the set capacity, that may occur during operation, or due to adjustments by controller 110, changes in load(s) 95, operation parameters of lithium ion device 80, operational characteristics and/or switching of charger(s) 90, etc. For example, range 112E may express capacity values of ±5%, ±10%, ±20%, or other values, e.g., <±30% of the respective set capacity.

In certain embodiments, controller 110 (optionally according to preferences obtained via user interface 115), may periodically define expected daily capacity values, possibly associated with user behavior patterns 216. For example, user interface 115 or any sensor(s), device(s) and/or application(s) associated with the user, and/or possibly controller 110, may be configured to anticipate user behavior such as extent of use of load(s) 95 on specific occasions such as days, weeks, etc. periods of the day, locations, etc., and define the set capacity accordingly (e.g., 112A-112D), to provide the user the anticipated required energy, as illustrated schematically in FIG. 8C. Moreover, controller 110 may be configured to define, possibly in association with user interface 115, an allocated emergency capacity that may be kept available 217 for emergency cases 114 (as indicated schematically in FIG. 8C, and see FIGS. 6A and 6B), without deteriorating lithium ion device 80, or reducing such eventual deterioration. It is noted that both the set capacity and the sum of the set capacity and the reserved emergency capacity are still smaller than the rated capacity of lithium ion device 80 (although clearly all rated capacity may be allocated in case of exceptional emergency).

Figure 9:
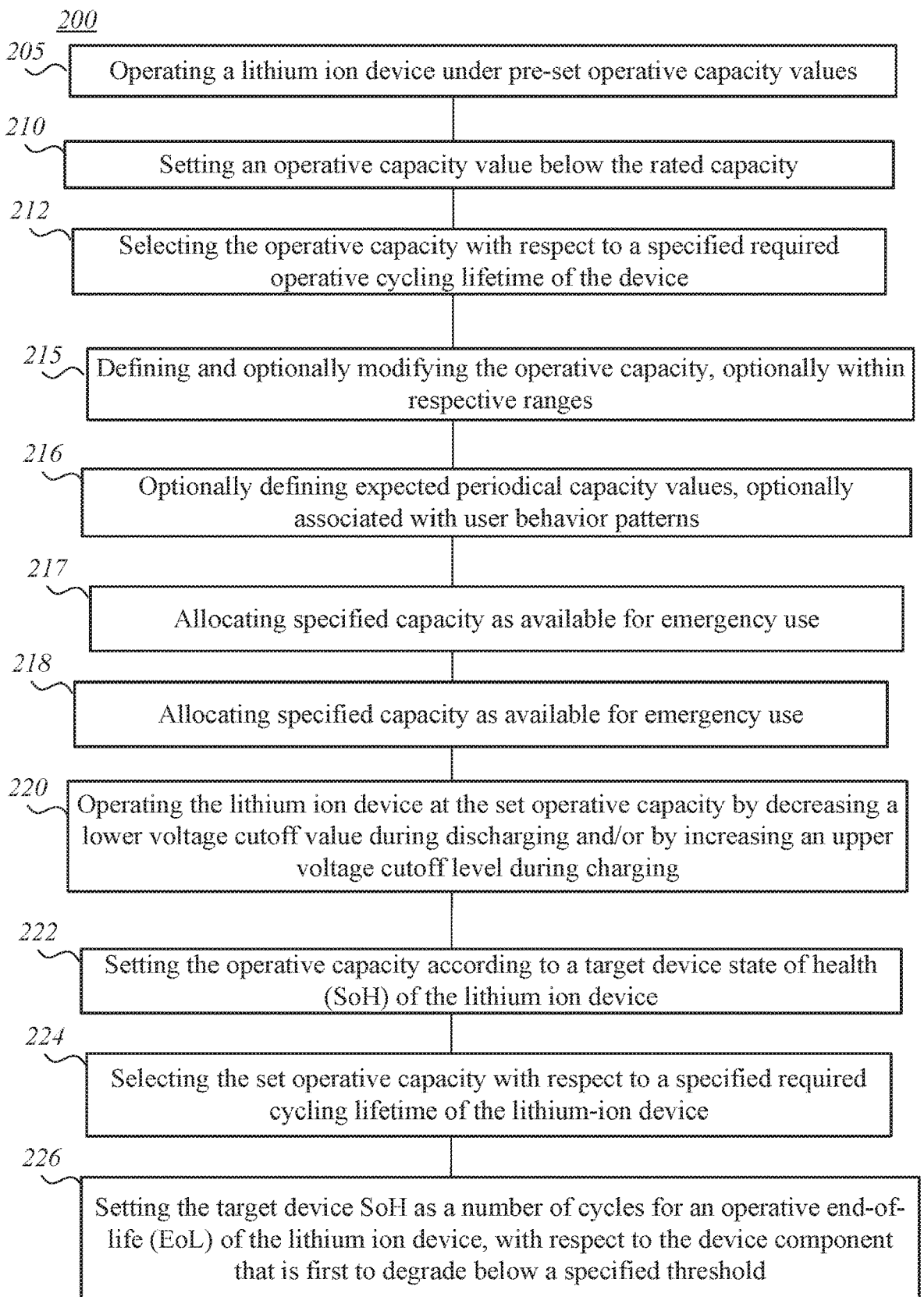
FIG. 9 is a high-level flowchart illustrating a method, according to some embodiments of the invention.
Figure 9:
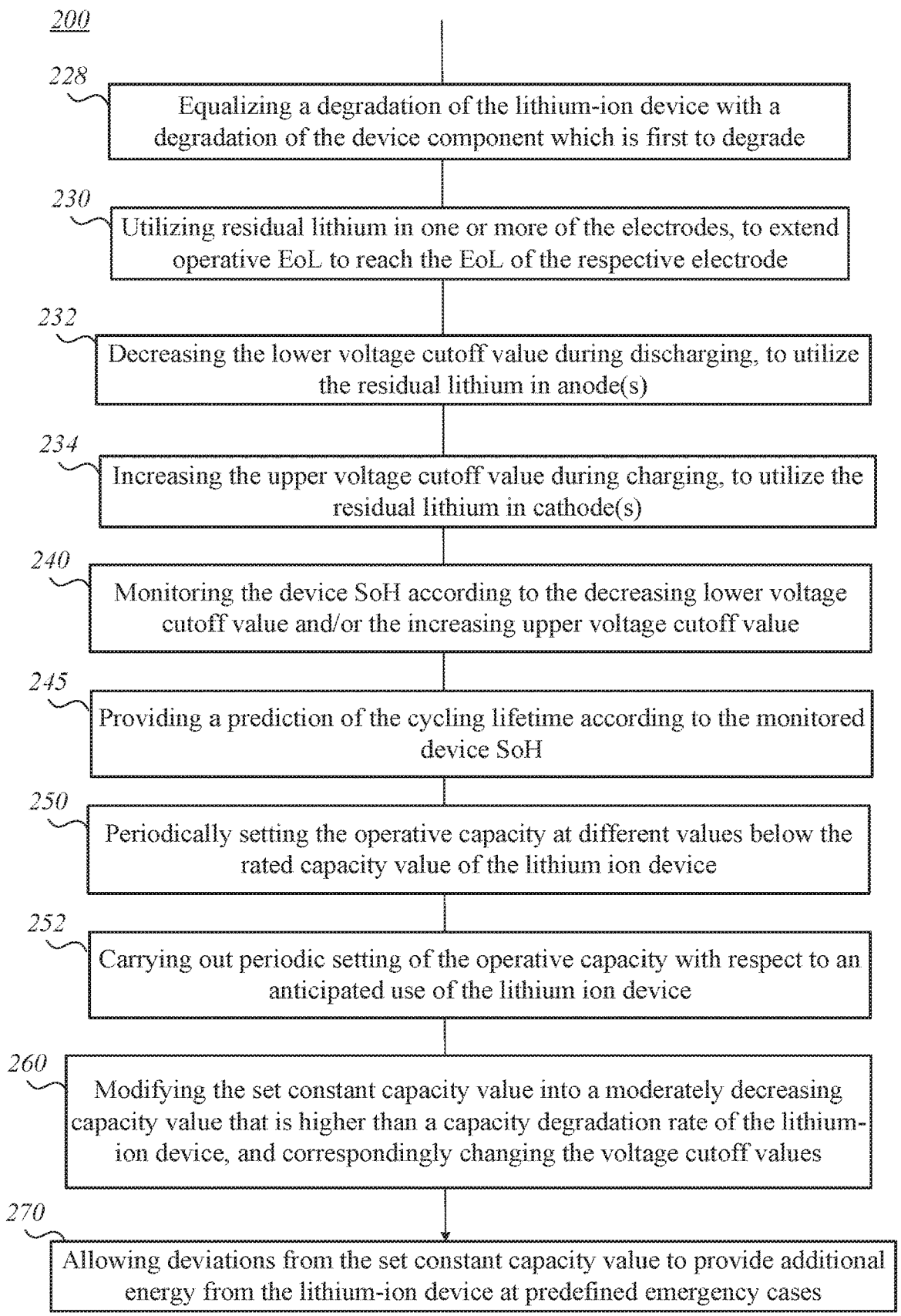

FIG. 9 is a high-level flowchart illustrating a method 200, according to some embodiments of the invention. The method stages may be carried out with respect to system 100 and/or controller 110 described above, which may optionally be configured to implement method 200. Method 200 may be at least partially implemented by at least one computer processor, e.g., in a controller. Certain embodiments comprise computer program products comprising a computer readable storage medium having computer readable program embodied therewith and configured to carry out the relevant stages of method 200. Method 200 may comprise the following stages, irrespective of their order.

Method 200 may comprise operating a lithium ion device under pre-set operative capacity values (stage 205), e.g., by setting an operative capacity value below a rated capacity value of the lithium ion device (stage 210), e.g., between 80% and 95% or between 85% and 90% of a rated capacity of the lithium ion device, or possibly selected with respect to a specified required operative cycling lifetime of the lithium ion device (stage 212). Method 200 may comprise operating the lithium ion device at the set operative capacity by decreasing a lower voltage cutoff value during discharging and/or by increasing an upper voltage cutoff level during charging (stage 220)—to support operation at the set operative capacity.

Method 200 may further comprise setting the operative capacity according to a target device state of health (SoH) of the lithium ion device (stage 222) and/or selecting the set operative capacity with respect to a specified required cycling lifetime of the lithium-ion device (stage 224).

In certain embodiments, method 200 may comprise setting the target device SoH as a number of cycles for an operative end-of-life (EoL) of the lithium ion device, wherein the operative EoL is set as the EoL of a device component that is first to degrade below a specified threshold (stage 226). For example, method 200 may comprise equalizing a degradation of the lithium-ion device with a degradation of the device component which is first to degrade (stage 228). It is noted that the operative EoL may result from the set operative capacity, with device component degradation being implicit.

For example, in certain embodiments, the device component which is first to degrade may be an electrode of the lithium ion device, and method 200 may comprise utilizing residual lithium in the electrode, to extend the operative EoL to reach the EoL of the electrode (stage 230). In certain embodiments, the electrode may be the anode, and operating the lithium ion device at the set operative capacity 205 may be carried out by decreasing the lower voltage cutoff value during discharging, to utilize the residual lithium in the anode (stage 232). In certain embodiments, the electrode may be the cathode, and operating the lithium ion device at the set operative capacity 205 may be carried out by increasing the upper voltage cutoff value during charging, to utilize the residual lithium in the cathode (stage 234).

In certain embodiments, method 200 may comprise defining and optionally modifying the set capacity, optionally within respective ranges (stage 215), for example with respect to user preferences and/or operational parameters of the lithium ion device and/or loads. In certain embodiments, method 200 may comprise defining expected periodical capacity values, optionally associated with user behavior patterns (stage 216). In certain embodiments, set capacity may be changed to accommodate for use patterns and/or operational parameters of the lithium ion device. In certain embodiments, method 200 may comprise allocating specified capacity as available for emergency use (stage 217), e.g., with respect to anticipated use or past performance. Optionally, the allocated emergency capacity may be partial with respect to the rated capacity of the lithium ion device, to reduce possible degradation thereof upon occurrence of corresponding emergency use requirements.

In certain embodiments, method 200 may further comprise setting the operative capacity to be constant within a range of 10% at most (stage 218), or optionally setting the operative capacity to be constant within a range of 5%, or 20%, at most.

In certain embodiments, method 200 may further comprise monitoring a state of health (SoH) of the device according to the decreasing lower voltage cutoff value and/or the increasing upper voltage cutoff value (stage 240). Optionally, method 200 may further comprise providing a prediction of a cycling lifetime (e.g., the operative and/or device EoL) according to the monitored SoH (stage 245).

In certain embodiments, method 200 may comprise periodically setting the operative capacity at different values below the rated capacity value of the lithium ion device (stage 250). Method 200 may further comprise carrying out periodic setting 250 of the operative capacity with respect to an anticipated use of the lithium ion device (stage 252).

In certain embodiments, method 200 may further comprise modifying the set constant capacity value into a moderately decreasing capacity value that is higher than a capacity degradation rate of the lithium-ion device, while decreasing the lower voltage cutoff value and/or increasing the upper voltage cutoff (stage 260).

In certain embodiments, method 200 may further comprise allowing deviations from the set constant capacity value to provide additional energy from the lithium-ion device at predefined emergency cases (stage 270).

Lithium ion device 80 may comprise at least some cells having metalloid-based anodes or all cells of device 80 or at least one module thereof may comprise metalloid-based anodes, e.g., as disclosed in U.S. Patent Publication No. 2017/0294687, incorporated herein by reference in its entirety. For example, cells may have anode active material that mainly comprises any of Si, Ge and/or Sn (e.g., >60% metalloids), in contrast to prior art cells that may have anode active material that mainly comprises carbon (e.g., >80% carbon) and may be decorated with metalloids (e.g., at <20 wt %). Disclosed lithium ion devices 80 (and/or respective cells, modules and/or batteries thereof) may at least partly be configured, e.g., by selection of materials, to enable operation at high charging and/or discharging rates (C-rate), ranging from 3-10 C-rate, 10-100 C-rate or even above 100C, e.g., 5C, 10C, 15C, 30C or more. It is noted that the term C-rate is a measure of charging and/or discharging of device capacity, e.g., with 1C denoting charging and/or discharging the device in an hour, and XC (e.g., 5C, 10C, 50C etc.) denoting charging and/or discharging the device in 1/X of an hour—with respect to a given capacity of the cell.

In certain embodiments, lithium ion device 80 may comprise cells with carbon-based anode material. For example, in such case the full voltage window may span 3-4.3V instead of 1.8-4.3V for cells with metalloid-based anodes, and increasing upper voltage cutoff and decreasing lower voltage cutoff may be defined and managed correspondingly, with respect to the modified full operation voltage window. Similar approach may be applied to any type of lithium-ion technology, including all carbon technologies.

Any of the disclosed embodiments may be implemented in lithium ion batteries to improve their cycle life, charging/discharging rates, safety and/or capacity. Lithium ion batteries typically comprise anodes and cathodes with current collectors affixed thereto, packed with electrolyte and separator(s) in a soft or/and hard package (e.g., pouches, prismatic or cylindrical packages, etc. Anodes are typically made of anode material particles and additional materials, such as conductive additive(s), binder(s), surfactants, dispersive materials, porosity control materials, etc., and may comprise any of the anode configurations taught, e.g., by U.S. Patent Publication No. 2017/0294687, incorporated herein by reference in its entirety. For example, anodes may be based on carbon (e.g., graphite, graphene or other carbon-based materials), metalloid anode material such as Si, Ge, Sn and their combinations and/or metals such as Li-metal. Cathodes may comprise lithium metal oxide (LiMeO), when Me can be one or several metals selected from Ni, Co, Mn and Al or sulfur-based cathodes. For example, cathodes may comprise materials based on layered, spinel and/or olivine frameworks, such as LCO formulations (based on $LiCoO_2$), NMC formulations (based on lithium nickel-manganese-cobalt), NCA formulations (based on lithium nickel cobalt aluminum oxides), LMO formulations (based on $LiMn_2O_4$), LMN formulations (based on lithium manganese-nickel oxides) lithium iron-phosphorus oxide (LFP) formulations (based on $LiFePO_4$), lithium rich cathodes, and/or combinations thereof. Separator(s) may comprise various materials, e.g., polymers such as any of polyethylene (PE), polypropylene (PP), polyethylene terephthalate (PET), poly vinylidene fluoride (PVDF), polymer membranes such as a polyolefin, polypropylene, or polyethylene membranes. Multi-membranes made of these materials, micro-porous films and/or spray coating thereof, woven or non-woven fabrics etc. may be used as separator(s), as well as possibly composite materials including, e.g., alumina, zirconia, titania, magnesia, silica and calcium carbonate along with various polymer components as listed above.

In any of the disclosed embodiments, electrolytes may be based on liquid electrolytes, typically linear and cyclic carbonates, such as ethylene carbonate, diethyl carbonate, propylene carbonate, VC (vinylene carbonate), FEC (fluoroethylene carbonate), EA (ethyl acetate), EMC (ethyl methyl carbonate), DMC (dimethyl carbonate) and combinations thereof. In various embodiments, the electrolytes may comprise any liquid, polymer, gel (e.g., inorganic silica gel electrolytes), glass (e.g., amorphous sulfides-based electrolytes), solid polymer electrolytes (e.g., polyethylene oxide, fluorine-containing polymers and copolymers such as polytetrafluoroethylene), polycrystalline inorganic solid electrolytes and/or combinations thereof. Electrolytes may comprise lithium electrolyte salt(s) such as $LiPF_6$, $LiBF_4$, lithium bis(oxalato)borate, $LiN(CF_3SO_2)_2$, $LiN(C_2F_5SO_2)_2$, $LiAsF_6$, $LiC(CF_3SO_2)_3$, $LiClO_4$, LiTFSI, $LiB(C_2O_4)_2$, $LiBF_2(C_2O_4)$), tris(trimethylsilyl)phosphite (TMSP), and combinations thereof. Ionic liquid(s) may be added to the electrolyte as taught by WIPO Publication No. WO 2018/109774, incorporated herein by reference in its entirety. For example, electrolytes may comprise a large proportion, e.g., 10%, 20%, 30% or more of VC and/or FEC as prominent cyclic carbonate compound, as disclosed e.g., in U.S. Pat. No. 10,199,677, incorporated herein by reference in its entirety. In certain embodiments, electrolytes may comprise linear solvent comprising at least one three-carbon and/or four-carbon chain ester, cyclic carbonate solvent and at least one lithium salt, as disclosed e.g., in U.S. patent application Ser. No. 16/243,190, incorporated herein by reference in its entirety.

Aspects of the present invention are described above with reference to flowchart illustrations and/or portion diagrams of methods, apparatus (systems) and computer program products according to embodiments of the invention. It will be understood that each portion of the flowchart illustrations and/or portion diagrams, and combinations of portions in the flowchart illustrations and/or portion diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or portion diagram or portions thereof.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or portion diagram or portions thereof.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or portion diagram or portions thereof.

The aforementioned flowchart and diagrams illustrate the architecture, functionality, and operation of possible implementations of systems, methods and computer program products according to various embodiments of the present invention. In this regard, each portion in the flowchart or portion diagrams may represent a module, segment, or portion of code, which comprises one or more executable instructions for implementing the specified logical function(s). It should also be noted that, in some alternative implementations, the functions noted in the portion may occur out of the order noted in the figures. For example, two portions shown in succession may, in fact, be executed substantially concurrently, or the portions may sometimes be executed in the reverse order, depending upon the functionality involved. It will also be noted that each portion of the portion diagrams and/or flowchart illustration, and combinations of portions in the portion diagrams and/or flowchart illustration, can be implemented by special purpose hardware-based systems that perform the specified functions or acts, or combinations of special purpose hardware and computer instructions.

In the above description, an embodiment is an example or implementation of the invention. The various appearances of "one embodiment", "an embodiment", "certain embodiments" or "some embodiments" do not necessarily all refer to the same embodiments. Although various features of the invention may be described in the context of a single embodiment, the features may also be provided separately or in any suitable combination. Conversely, although the invention may be described herein in the context of separate embodiments for clarity, the invention may also be implemented in a single embodiment. Certain embodiments of the invention may include features from different embodiments disclosed above, and certain embodiments may incorporate elements from other embodiments disclosed above. The disclosure of elements of the invention in the context of a specific embodiment is not to be taken as limiting their use in the specific embodiment alone. Furthermore, it is to be understood that the invention can be carried out or practiced in various ways and that the invention can be implemented in certain embodiments other than the ones outlined in the description above.

The invention is not limited to those diagrams or to the corresponding descriptions. For example, flow need not move through each illustrated box or state, or in exactly the same order as illustrated and described. Meanings of technical and scientific terms used herein are to be commonly understood as by one of ordinary skill in the art to which the invention belongs, unless otherwise defined. While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

What is claimed is:

1. A method of operating a lithium ion device, the method comprising:
    setting a target device state of health (SoH) as a number of cycles for an operative end-of-life (EoL) of the lithium ion device, wherein the operative EoL is an EoL of a device component that is first to degrade below a specified threshold to equalize a degradation of the lithium-ion device with a degradation of the device component;
    setting an operative capacity below a rated capacity value of the lithium ion device, and according to the target device SoH of the lithium ion device; and
    operating the lithium ion device at the set operative capacity by decreasing a lower voltage cutoff value during discharging and/or by increasing an upper voltage cutoff level during charging to support operation at the set operative capacity.

2. The method of claim 1, wherein the device component is an electrode of the lithium ion device, and the method further comprises utilizing residual lithium in the electrode, to extend the operative EoL to reach the EoL of the electrode.

3. The method of claim 2, wherein the electrode is an anode, and the operating of the lithium ion device at the set operative capacity is carried out by decreasing the lower voltage cutoff value during discharging, to utilize the residual lithium in the anode.

4. The method of claim 2, wherein the electrode is a cathode, and the operating of the lithium ion device at the set operative capacity is carried out by increasing the upper voltage cutoff value during charging, to utilize the residual lithium in the cathode.

5. The method of claim 1, wherein the operative capacity is set between 80% and 95% of the rated capacity of the lithium-ion device.

6. The method of claim 1, further comprising monitoring the SoH of the lithium-ion device according to the decreasing lower voltage cutoff value and/or the increasing upper voltage cutoff.

7. The method of claim 6, further comprising providing a prediction of a cycling lifetime of the lithium-ion device's operative EoL according to the monitored SoH.

8. The method of claim 1, wherein the operative capacity is set to be constant within a range of 10% at most.

9. The method of claim 1, wherein the setting of the operative capacity below the rated capacity value of the lithium ion device is carried out periodically.

10. The method of claim 9, further comprising carrying out the periodic setting of the operative capacity with respect to an anticipated use of the lithium ion device.

11. The method of claim 1, wherein the operative capacity is set to be a moderately decreasing capacity value that is higher than a capacity degradation rate of the lithium-ion device.

12. The method of claim 1, wherein the lithium ion device has at least one lithium ion cell comprising anodes with metalloid-based anode active material.

13. A method of operating a lithium ion device, the method comprising:
    setting an operative capacity below a rated capacity value of the lithium ion device;
    operating the lithium ion device at the set operative capacity by decreasing a lower voltage cutoff value during discharging and/or by increasing an upper voltage cutoff level during charging to support operation at the set operative capacity; and
    allowing deviations from the set operative capacity value to provide additional energy from the lithium-ion device at predefined emergency cases.

14. A controller for operating a lithium ion device, the controller configured to:
    operate the lithium ion device at a predetermined set operative capacity, which is smaller than a rated capacity value of the lithium ion device, by decreasing a lower voltage cutoff value during discharging and/or by increasing an upper voltage cutoff level during charging; and
    carry out the decreasing of the lower voltage cutoff value during discharging to utilize lithium residuals in anodes of the lithium ion device and/or to carry out the increasing of the upper voltage cutoff value during charging to utilize lithium residuals in cathodes of the lithium ion device according to characteristics of the lithium ion device that correspond to the respective lithium residuals.

15. The controller of claim 14, further configured to monitor a state of health (SoH) of the lithium ion device.

16. A controller for operating a lithium ion device, the controller configured to:
- operate the lithium ion device at a predetermined set operative capacity, which is smaller than a rated capacity value of the lithium ion device, by decreasing a lower voltage cutoff value during discharging and/or by increasing an upper voltage cutoff level during charging; and
- set the operative capacity with respect to an anticipated use of the lithium ion device and to allocate specified capacity that is designated to provide additional energy from the lithium-ion device at predefined emergency cases.

* * * * *